US011379727B2

(12) United States Patent
Sharma et al.

(10) Patent No.: US 11,379,727 B2
(45) Date of Patent: Jul. 5, 2022

(54) SYSTEMS AND METHODS FOR ENHANCING A DISTRIBUTED MEDICAL NETWORK

(71) Applicant: SHANGHAI UNITED IMAGING INTELLIGENCE CO., LTD., Shanghai (CN)

(72) Inventors: Abhishek Sharma, Boston, MA (US); Arun Innanje, Lexington, MA (US); Ziyan Wu, Lexington, MA (US); Shanhui Sun, Lexington, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 276 days.

(21) Appl. No.: 16/694,298

(22) Filed: Nov. 25, 2019

(65) Prior Publication Data

US 2021/0158167 A1    May 27, 2021

(51) Int. Cl.
*G06N 3/08* (2006.01)
*G06N 20/00* (2019.01)
*H04L 29/08* (2006.01)
*H04L 67/10* (2022.01)
*H04L 67/12* (2022.01)
*H04L 67/00* (2022.01)

(52) U.S. Cl.
CPC ............. *G06N 3/084* (2013.01); *G06N 3/08* (2013.01); *G06N 20/00* (2019.01); *H04L 67/10* (2013.01); *H04L 67/12* (2013.01); *H04L 67/34* (2013.01)

(58) Field of Classification Search
CPC .......... G06N 3/08; G06N 3/084; G06N 20/00; G16H 10/60; G16H 30/20; H04L 67/10; H04L 67/12; H04L 67/34; H04L 67/1097
See application file for complete search history.

(56) References Cited

U.S. PATENT DOCUMENTS

| | | | | |
|---|---|---|---|---|
| 10,867,697 B2* | 12/2020 | Lyman | ................... | A61B 6/563 |
| 10,963,518 B2* | 3/2021 | Aggour | ............... | G06F 16/9038 |
| 10,997,187 B2* | 5/2021 | Aggour | ............... | G06F 16/9038 |
| 11,182,411 B2* | 11/2021 | Bart | ........................ | G16H 10/60 |
| 2005/0182846 A1* | 8/2005 | Schofield | ............... | G16H 30/20 |
| | | | | 709/232 |

(Continued)

*Primary Examiner* — Kostas J Katsikis
(74) *Attorney, Agent, or Firm* — Faegre Drinker Biddle & Reath LLP

(57) ABSTRACT

Methods and systems for enhancing a distributed medical network. For example, a computer-implemented method includes inputting training data corresponding to each local computer into their corresponding machine learning model; generating a plurality of local losses including generating a local loss for each machine learning model based at least in part on the corresponding training data; generating a plurality of local parameter gradients including generating a local parameter gradient for each machine learning model based at least in part on the corresponding local loss; generating a global parameter update based at least in part on the plurality of local parameter gradients; and updating each machine learning model hosted at each local computer of the plurality of local computers by at least updating their corresponding active parameter set based at least in part on the global parameter update.

18 Claims, 8 Drawing Sheets

(56) References Cited

U.S. PATENT DOCUMENTS

| | | | |
|---|---|---|---|
| 2005/0196030 A1* | 9/2005 | Schofield | H04L 67/325 |
| | | | 382/132 |
| 2016/0026837 A1* | 1/2016 | Good | H04W 4/025 |
| | | | 340/539.13 |
| 2018/0295466 A1* | 10/2018 | Cannell | H04W 40/244 |
| 2019/0005200 A1* | 1/2019 | Zimmerman | G06N 20/00 |
| 2019/0327161 A1* | 10/2019 | Cannell | H04W 4/02 |
| 2020/0334539 A1* | 10/2020 | Wang | G06K 9/627 |
| 2021/0209249 A1* | 7/2021 | Hoffer | G06F 21/6245 |

\* cited by examiner

SYSTEMS AND METHODS FOR ENHANCING A DISTRIBUTED MEDICAL NETWORK

1. BACKGROUND OF THE INVENTION

Hospitals collectively have a great amount of patient medical data that can be used for various tasks. For example, each hospital may include a medical system configured for a certain medical application, which may utilize particular patient medical data to improve their ability to perform a particular task. Currently, hospitals, which may be located at various geographical locations, suffer from great inefficiencies in sharing pertinent patient medical data with each other, in particularly data for improving neural network. Thus, systems and methods for enhancing data sharing in medical data systems are desirable.

2. BRIEF SUMMARY OF THE INVENTION

Certain embodiments of the present invention are directed to medical data systems. More particularly, some embodiments of the invention provide methods and systems for enhancing a distributed medical network. Merely by way of example, some embodiments of the invention are configured to train a plurality of machine learning models hosted by a plurality of local hospitals. But it would be recognized that the invention has a much broader range of applicability.

In various embodiments, a computer-implemented method for enhancing a distributed medical network (e.g., a distributed medical network including a plurality of local computers, each local computer of the plurality of local computers hosting a machine learning model configured with an active parameter set) includes: inputting training data corresponding to each local computer into their corresponding machine learning model; generating a plurality of local losses including generating a local loss for each machine learning model based at least in part on the corresponding training data; generating a plurality of local parameter gradients including generating a local parameter gradient for each machine learning model based at least in part on the corresponding local loss; generating a global parameter update based at least in part on the plurality of local parameter gradients; and updating each machine learning model hosted at each local computer of the plurality of local computers by at least updating their corresponding active parameter set based at least in part on the global parameter update.

In various embodiments, a system for enhancing a distributed medical network (e.g., a distributed medical network including a plurality of local computers, each local computer of the plurality of local computers hosting a machine learning model configured with an active parameter set) includes: a data inputting module configured to input training data corresponding to each local computer into their corresponding machine learning model; a loss generating module configured to generate a plurality of local losses by at least generating a local loss for each machine learning model based at least in part on the corresponding training data; a gradient generating module configured to generate a plurality of local parameter gradients by at least generating a local parameter gradient for each machine learning model based at least in part on the corresponding local loss; an update generating module configured to generate a global parameter update based at least in part on the plurality of local parameter gradients; and a model updating module configured to update each machine learning model hosted at each local computer of the plurality of local computers by at least updating their corresponding active parameter set based at least in part on the global parameter update.

In various embodiments, a non-transitory computer-readable medium with instructions stored thereon, that when executed by a processor, causes the processor to perform one or more processes including: inputting training data corresponding to each local computer into their corresponding machine learning model; generating a plurality of local losses including generating a local loss for each machine learning model based at least in part on the corresponding training data; generating a plurality of local parameter gradients including generating a local parameter gradient for each machine learning model based at least in part on the corresponding local loss; generating a global parameter update based at least in part on the plurality of local parameter gradients; and updating each machine learning model hosted at each local computer of the plurality of local computers by at least updating their corresponding active parameter set based at least in part on the global parameter update.

Depending upon embodiment, one or more benefits may be achieved. These benefits and various additional objects, features and advantages of the present invention can be fully appreciated with reference to the detailed description and accompanying drawings that follow.

3. BRIEF DESCRIPTION OF THE DRAWINGS

4. DETAILED DESCRIPTION OF THE INVENTION

Figure 1:
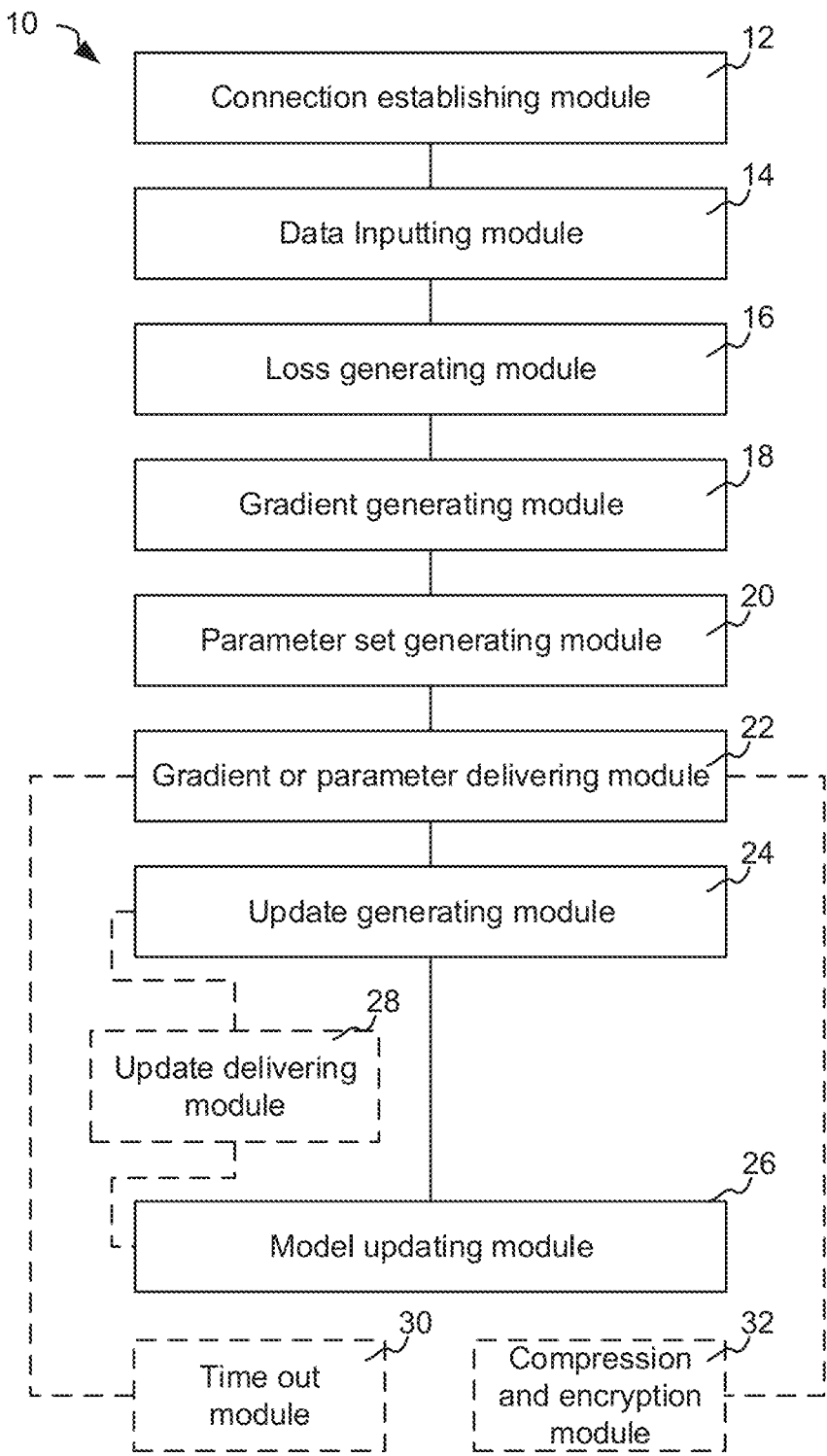
FIG. 1 is a simplified diagram showing a system for enhancing a distributed medical network, according to some embodiments.

FIG. 1 is a simplified diagram showing a system for enhancing a distributed medical network, according to some embodiments. This diagram is merely an example, which should not unduly limit the scope of the claims. One of ordinary skill in the art would recognize many variations, alternatives, and modifications. In some examples, the system 10 includes a connection establishing module 12, a data inputting module 14, a loss generating module 16, a gradient generating module 18, a parameter set generating module 20, a gradient or parameter delivering module 22, an update generating module 24, and a model updating module 26. In certain examples, the system 10 further includes an update delivering module 28, a time out module 30, and/or a compression and encryption module 32. In some examples, the system 10 is configured to enhance a distributed medical network. For example, the system 10 is configured to enhance a distributed medical network including a plurality of local computers, where each local computer hosts a machine learning model configured with an active parameter set. In some examples, the distributed medical network further includes a central computer, (e.g., coupled to the plurality of local computers). In certain examples, the system 10 is configured to implement method S100 of FIGS. 2A and 2B and/or method S200 of FIGS. 3A and 3B. Although the above has been shown using a selected group of components, there can be many alternatives, modifications, and variations. For example, some of the components may be expanded and/or combined. Some components may be removed. Other components may be inserted to those noted above. Depending upon the embodiment, the arrangement of components may be interchanged with others replaced.

In various embodiments, the connection establishing module 12 is configured to establish connection between the plurality of local computers and a central computer. In some examples, the connection establishing module 12 is configured to establish connection between each local computer of the plurality of local computers. In various examples, the connection establishing module 12 is configured to establish connection by a wireless and/or wired connection. In certain examples, the connection establishing module 12 is configured to establish a data transfer connection for sharing, transferring, transmitting, and/or communicating data. In certain examples, the connection establishing module 12 is a separate module coupled to the system 10 and not part of system 10.

In various embodiments, the data inputting module 14 is configured to input data into each local computer of the plurality of local computers. In some examples, the data inputting module 14 is configured to input priming data and/or training data into each machine learning model hosted at leach local computer of the plurality of local computers. For example, the data inputting module 14 is configured to input priming data and/or training data corresponding to each local computer into their corresponding machine learning model. In certain examples, the data inputting module 14 is configured to input a first training data into a first machine learning model hosted at a first local computer of the plurality of local computers, a second training data into a second machine learning model hosted at a second local computer of the plurality of local computers, . . . , and a $N^{th}$ training data into a $N^{th}$ machine learning model hosted at a $N^{th}$ local computer of the plurality of local computers. In certain examples, training data includes a medical image (e.g., a pre-analyzed medical image with a corresponding ground truth) and/or patient data. In some examples, the training data inputted into each machine learning model is different. In certain examples, the data inputting module 14 is configured to input a first priming data into a first machine learning model hosted at a first local computer of the plurality of local computers, a second priming data into a second machine learning model hosted at a second local computer of the plurality of local computers, . . . , and a $N^{th}$ priming data into a $N^{th}$ machine learning model hosted at a $N^{th}$ local computer of the plurality of local computers. In certain examples, priming data includes a medical image (e.g., a pre-analyzed medical image with a corresponding ground truth) and/or patient data. In some examples, the priming data inputted into each machine learning model is different. In various examples, the training data and priming data for each machine learning model is the same.

In various embodiments, the loss generating module 16 is configured to generate a local loss for each machine learning model hosted at the plurality of local computers. For example, the loss generating module 16 is configured to generate a plurality of local losses by at least generating a local loss for each machine learning model hosted at the plurality of local computers. In various examples, the loss generating module 16 is configured to generate the local loss based at least in part on the training data, such as further based in part on one or more ground truths corresponding to the training data. In various examples, the loss generating module 16 is configured to generate the local loss based at least in part on the priming data, such as further based in part on one or more ground truths corresponding to the priming data.

In some examples, the gradient generating module 18 is configured to generate a local parameter gradient for each machine learning model hosted by its corresponding local computer. For example, the gradient generating module 18 is configured to generate a non-zero (e.g., corresponds to change) local parameter gradient for each machine learning model hosted by its corresponding local computer. In various examples, each non-zero local parameter gradient corresponds to an incremental weight snapshot of the neural network. In some examples, a non-zero local parameter gradient, when backpropagated into the one or more model layers of the machine learning model, help guide the changing of one or more parameters of the machine learning model, such as during a training (e.g., enhancing) process.

In some examples, the gradient generating module 18 is configured to generate a local weight gradient for each machine learning model hosted by its corresponding local computer. For example, the gradient generating module 18 is configured to generate a non-zero (e.g., corresponds to change) local weight gradient for each machine learning model hosted by its corresponding local computer. In various examples, each non-zero local weight gradient corresponds to an incremental weight snapshot of the neural network. In some examples, a non-zero local weight gradient, when backpropagated into the one or more model layers of the machine learning model, help guide the changing of one or more parameters of the machine learning model, such as during a training (e.g., enhancing) process.

In some examples, the gradient generating module 18 is configured to generate a local bias gradient for each machine learning model hosted by its corresponding local computer. For example, the gradient generating module 18 is configured to generate a non-zero local bias gradient (e.g., corresponds to change) for each machine learning model hosted by its corresponding local computer. In various examples, each non-zero local bias gradient corresponds to an incremental bias snapshot of the neural network. In some examples, a non-zero local bias gradient, when backpropagated into the one or more model layers of the machine learning model, help guide the changing of one or more parameters of the machine learning model, such as during a training (e.g., enhancing) process.

In various embodiments, the parameter set generating module 20 is configured to generate a local parameter set for each machine learning model hosted by its corresponding local computer. In some examples, the gradient generating module 18 is configured to generate a local set of weights for each machine learning model hosted by its corresponding local computer. In some examples, the gradient generating module 18 is configured to generate a local set of biases for each machine learning model hosted by its corresponding local computer.

In various embodiments, the gradient or parameter delivering module 22 is configured to deliver a plurality of local parameter gradients from the plurality of local computers to a central computer of the distributed medical network. For example, the gradient or parameter delivering module 22 is configured to deliver a first local parameter gradient from a first local computer to the central computer, a second local parameter gradient from a second local computer to the central computer, . . . , and a $N^{th}$ local parameter gradient from the $N^{th}$ local computer to the central computer. In some examples, the gradient or parameter delivering module 22 is configured to deliver the plurality of local parameter gradients between the plurality of local computers. For example, the gradient or parameter delivering module 22 is configured to deliver the local parameter gradient corresponding to each local computer with all other local computers of the plurality of local computers. For example, the gradient or parameter delivering module 22 is configured to deliver a first local parameter gradient from a first local computer to a second local computer, a third local computer, . . . , and a $N^{th}$ local computer. In some examples, the gradient or parameter delivering module 22 is configured to deliver the plurality of local parameter gradients via the connection established by the connection establishing module 12.

In various embodiments, the gradient or parameter delivering module 22 or a separate weight delivering module of system 10, is configured to deliver a plurality of local weight gradients (e.g., as a plurality of local parameter gradients) from the plurality of local computers to a central computer of the distributed medical network. For example, the gradient or parameter delivering module 22 is configured to deliver a first local weight gradient from a first local computer to the central computer, a second local weight gradient from a second local computer to the central computer, . . . , and a $N^{th}$ local weight gradient from the $N^{th}$ local computer to the central computer. In some examples, the gradient or parameter delivering module 22 is configured to deliver the plurality of local weight gradients between the plurality of local computers. For example, the gradient or parameter delivering module 22 is configured to deliver the weight gradient corresponding to each local computer to every other local computers of the plurality of local computers. For example, the gradient or parameter delivering module 22 is configured to deliver a first local weight gradient from a first local computer to a second local computer, a third local computer, . . . , and a $N^{th}$ local computer. In some examples, the gradient or parameter delivering module 22 is configured to deliver the plurality of local weight gradients via the connection established by the connection establishing module 12.

In various embodiments, the gradient or parameter delivering module 22 or a separate bias delivering module of system 10, is configured to deliver a plurality of local bias gradients (e.g., as a plurality of local parameter gradients) from the plurality of local computers to a central computer of the distributed medical network. For example, the gradient or parameter delivering module 22 is configured to deliver a first local bias gradient from a first local computer to the central computer, a second local bias gradient from a second local computer to the central computer, . . . , and a $N^{th}$ local bias gradient from the $N^{th}$ local computer to the central computer. In some examples, the gradient or parameter delivering module 22 is configured to deliver the plurality of local bias gradients between the plurality of local computers. For example, the gradient or parameter delivering module 22 is configured to deliver the bias gradient corresponding to each local computer with all other local computers of the plurality of local computers. For example, the gradient or parameter delivering module 22 is configured to deliver a first local bias gradient from a first local computer to a second local computer, a third local computer, . . . , and a $N^{th}$ local computer. In some examples, the gradient or parameter delivering module 22 is configured to deliver the plurality of local bias gradients via the connection established by the connection establishing module 12.

In various embodiments, the gradient or parameter delivering module 22 is configured to deliver a plurality of local parameter sets from the plurality of local computers to a central computer of the distributed medical network. For example, the gradient or parameter delivering module 22 is configured to deliver a first local parameter set from a first local computer to the central computer, a second local parameter set from a second local computer to the central computer, . . . , and a $N^{th}$ local parameter set from the $N^{th}$ local computer to the central computer. In some examples, the gradient or parameter delivering module 22 is configured to deliver the plurality of local parameter sets between the plurality of local computers. For example, the gradient or parameter delivering module 22 is configured to deliver the local parameter set corresponding to each local computer with all other local computers of the plurality of local computers. For example, the gradient or parameter delivering module 22 is configured to deliver a first local parameter set from a first local computer to a second local computer, a third local computer, . . . , and a $N^{th}$ local computer. In some examples, the gradient or parameter delivering module 22 is configured to deliver the plurality of local parameter sets via the connection established by the connection establishing module 12.

In various embodiments, the gradient or parameter delivering module 22 or a separate weight delivering module of system 10, is configured to deliver a plurality of local sets of weights (e.g., as a plurality of local parameter sets) from the plurality of local computers to a central computer of the distributed medical network. For example, the gradient or parameter delivering module 22 is configured to deliver a first local set of weights from a first local computer to the central computer, a second local set of weights from a second local computer to the central computer, . . . , and a $N^{th}$ local set of weights from the $N^{th}$ local computer to the central computer. In some examples, the gradient or parameter delivering module 22 is configured to deliver the plurality of local sets of weights between the plurality of local computers. For example, the gradient or parameter delivering module 22 is configured to deliver the set of weights corresponding to each local computer to every other local computers of the plurality of local computers. For example, the gradient or parameter delivering module 22 is configured to deliver a first local set of weights from a first local computer to a second local computer, a third local computer, . . . , and a $N^{th}$ local computer. In some examples, the gradient or parameter delivering module 22 is configured to deliver the plurality of local sets of weights via the connection established by the connection establishing module 12.

In various embodiments, the gradient or parameter delivering module 22 or a separate bias delivering module of system 10, is configured to deliver a plurality of local sets of biases (e.g., as a plurality of local parameter sets) from the plurality of local computers to a central computer of the distributed medical network. For example, the gradient or parameter delivering module 22 is configured to deliver a first local set of biases from a first local computer to the central computer, a second local set of biases from a second local computer to the central computer, . . . , and a $N^{th}$ local set of biases from the $N^{th}$ local computer to the central computer. In some examples, the gradient or parameter delivering module 22 is configured to deliver the plurality of local sets of biases between the plurality of local computers. For example, the gradient or parameter delivering module 22 is configured to deliver the set of biases corresponding to each local computer to every other local computers of the plurality of local computers. For example, the gradient or parameter delivering module 22 is configured to deliver a first local set of biases from a first local computer to a second local computer, a third local computer, . . . , and a $N^{th}$ local computer. In some examples, the gradient or parameter delivering module 22 is configured to deliver the plurality of local sets of biases via the connection established by the connection establishing module 12.

In various embodiments, the update generating module 24 is configured to generate a global parameter update based at least in part on the plurality of local parameter gradients (e.g., weight gradients and/or bias gradients). In certain examples, the global parameter update corresponds to a plurality of global parameter gradients. In certain examples, the plurality of global parameter gradients corresponds to the plurality of local parameter gradients. In some examples, the update generating module 24 is configured to generate the plurality of global parameter gradients, such as by averaging the plurality of local parameter gradients. In various examples, the update generating module 24 is configured to generate the global parameter update by at least backpropagating the plurality of global parameter gradients into the one or more model layers of the machine learning model (e.g., at the central computer or at each local computer of the plurality of local computers). In certain examples, the global parameter update includes the changes to be applied to the model parameters of a model at a prior iteration. In certain examples, the global parameter update includes the values after the changes have been applied to the model parameters of a model at a prior iteration.

In some examples, the update generating module 24 is configured to generate a global weight update (e.g., as part of the global parameter update) based at least in part on a plurality of local weight gradients. For example, the update generating module 24 is configured to generate the global weight update by at least averaging the plurality of local weight gradients. In certain examples, each local weight gradient of the plurality of local weight gradients corresponds to a local loss and a corresponding local computer. For example, each local weight gradient of the plurality of local weight gradients corresponds to a local computer of the plurality of local computers. In some examples, a weight gradient corresponds to the change in weight needed to be applied to a prior iteration of a machine learning model (e.g., a neural network) during an iterative training process. In certain examples, the global weight update includes the changes to be applied to the model weights of a model at a prior iteration. In certain examples, the global weight update includes the values after the changes have been applied to the weights of a model at a prior iteration.

In some examples, the update generating module 24 is configured to generate a global bias update (e.g., as part of the global parameter update) based at least in part on a plurality of local bias gradients. For example, the update generating module 24 is configured to generate the global bias update by at least averaging the plurality of local bias gradients. In certain examples, each local bias gradient of the plurality of local bias gradients corresponds to a local loss and a corresponding local computer. For example, each local bias gradient of the plurality of local bias gradients corresponds to a local computer of the plurality of local computers. In some examples, a bias gradient corresponds to the change in bias needed to be applied to a prior iteration of a machine learning model (e.g., a neural network) during an iterative training process. In certain examples, the global bias update includes the changes to be applied to the model biases of a model at a prior iteration. In certain examples, the global bias update includes the values after the changes have been applied to the biases of a model at a prior iteration.

In some examples, the update generating module 24 is configured to generate the global parameter update at the central computer of the distributed medical network. In some examples, the update generating module 24 is configured to generate the global parameter update at each local computer of the plurality of local computers. For example, each local computer is configured to generate, such as under the instruction of the update generating module 24, the global parameter update. In various examples, the global parameter update generated at each local computer of the plurality of local computers is the same with the other global parameter updates generated at other local computers of the plurality of local computers.

In various embodiments, the update generating module 24 is configured to generate a global parameter update based at least in part on the plurality of local parameter sets (e.g., sets of weights and/or sets of biases). In certain examples, the global parameter update corresponds to a plurality of global parameter sets. In certain examples, the plurality of global parameter sets corresponds to the plurality of local parameter sets. In some examples, the update generating module 24 is configured to generate the plurality of global parameter sets, such as by averaging the plurality of local parameter sets.

In some examples, the update generating module 24 is configured to generate a global weight update (e.g., as part of the global parameter update) based at least in part on a plurality of local sets of weights. For example, the update generating module 24 is configured to generate the global weight update by at least averaging the plurality of local sets of weights. In certain examples, each local set of weights of the plurality of local sets of weights corresponds to a local loss and a corresponding local computer. For example, each local set of weights of the plurality of local sets of weights corresponds to a local computer of the plurality of local computers. In some examples, a set of weights corresponds to the change in weight needed to be applied to a prior iteration of a machine learning model (e.g., a neural network) during an iterative training process. In certain examples, the global weight update includes the changes to be applied to the model weights of a model at a prior iteration. In certain examples, the global weight update includes the values after the changes have been applied to the weights of a model at a prior iteration.

In some examples, the update generating module 24 is configured to generate a global bias update (e.g., as part of the global parameter update) based at least in part on a plurality of local sets of biases. For example, the update generating module 24 is configured to generate the global bias update by at least averaging the plurality of local sets of biases. In certain examples, each local set of biases of the plurality of local sets of biases corresponds to a local loss and a corresponding local computer. For example, each local set of biases of the plurality of local sets of biases corresponds to a local computer of the plurality of local computers. In some examples, a set of biases corresponds to the change in bias needed to be applied to a prior iteration of a machine learning model (e.g., a neural network) during an iterative training process. In certain examples, the global bias update includes the changes to be applied to the model biases of a model at a prior iteration. In certain examples, the global bias update includes the values after the changes have been applied to the biases of a model at a prior iteration.

In various embodiments, the model updating module 26 is configured to update each machine learning model hosted at each local computer of the plurality of local computers by at least updating their corresponding active parameter set based at least in part on the global parameter update. For example, the model updating module 26 is configured to update each machine learning model hosted at each local computer of the plurality of local computers by applying the global parameter update (e.g., including new weights and/or biases) to their prior active parameter set.

In various embodiments, the update delivering module 28 is configured to deliver the global parameter update from the central computer to the plurality of local computers. In some examples, the update delivering module 28 is configured to deliver the global parameter update from the central computer to each local computer of the plurality of local computers. In various embodiments, the update delivering module 28 is configured to deliver the global weight update from the central computer to the plurality of local computers. In some examples, the update delivering module 28 is configured to deliver the global weight update from the central computer to each local computer of the plurality of local computers. In various embodiments, the update delivering module 28 is configured to deliver the global bias update from the central computer to the plurality of local computers. In some examples, the update delivering module 28 is configured to deliver the global bias update from the central computer to each local computer of the plurality of local computers.

In various embodiments, the time out module 30 is configured to implement a time out period on the central computer such that the central computer is configured to reject receipt of local parameter gradient (e.g., from one or more of the plurality of local computers) during the time out period. In some examples, the time out module 30 is configured to implement a time out period on each local computer such that each local computer is configured to reject receipt of local parameter gradient (e.g., from one or more of the plurality of local computers) during the time out period. Alternatively, in certain embodiments, the time out module 30 is configured to implement a time out period on the central computer such that the central computer is configured to only receive local parameter gradient (e.g., from one or more of the plurality of local computers) during the time out period. In certain examples, the time out module 30 is configured to implement a time out period on each local computer such that each local computer is configured to only receive local parameter gradient (e.g., from one or more of the plurality of local computers) during the time out period.

In various embodiments, the compression and encryption module 32 is configured to, such as before delivering the plurality of local parameter gradients, compress the plurality of local parameter gradients at the plurality of local computers, and, such as after delivering the plurality of local parameter gradients, decompress the compressed plurality of local parameter gradients at the central computer. In some examples, the compression and encryption module 32 is configured to, such as before delivering the plurality of local parameter gradients, compress the plurality of local parameter gradients at the plurality of local computers, and, such as after delivering the plurality of local parameter gradients, decompress the compressed plurality of local parameter gradients at the plurality of local computers.

In various examples, the compression and encryption module 32 is configured to, such as before delivering the plurality of local weight gradients, compress the plurality of local weight gradients at the plurality of local computers, and, such as after delivering the plurality of local weight gradients, decompress the compressed plurality of local weight gradients at the central computer. In some examples, the compression and encryption module 32 is configured to, such as before delivering the plurality of local weight gradients, compress the plurality of local weight gradients at the plurality of local computers; and, such as after delivering the plurality of local weight gradients, decompress the compressed plurality of local weight gradients at the plurality of local computers.

In various examples, the compression and encryption module 32 is configured to, such as before delivering the plurality of local bias gradients, compress the plurality of local bias gradients at the plurality of local computers, and, such as after delivering the plurality of local bias gradients, decompress the compressed plurality of local bias gradients at the central computer. In some examples, the compression and encryption module 32 is configured to, such as before delivering the plurality of local bias gradients, compress the plurality of local bias gradients at the plurality of local computers, and, such as after delivering the plurality of local bias gradients, decompress the compressed plurality of local bias gradients at the plurality of local computers.

In various embodiments, the compression and encryption module 32 is configured to, such as before delivering the plurality of local parameter gradients, encrypt the plurality of local parameter gradients at the plurality of local computers, and, such as after delivering the plurality of local parameter gradients, decrypt the encrypted plurality of local parameter gradients at the central computer. In some examples, the compression and encryption module 32 is configured to, such as before delivering the plurality of local parameter gradients, encrypt the plurality of local parameter gradients at the plurality of local computers, and, such as after delivering the plurality of local parameter gradients, decrypt the encrypted plurality of local parameter gradients at the plurality of local computers.

In various examples, the compression and encryption module 32 is configured to, such as before delivering the plurality of local weight gradients, encrypt the plurality of local weight gradients at the plurality of local computers, and, such as after delivering the plurality of local weight gradients, decrypt the encrypted plurality of local weight gradients at the central computer. In some examples, the compression and encryption module 32 is configured to, such as before delivering the plurality of local weight gradients, encrypt the plurality of local weight gradients at the plurality of local computers; and, such as after delivering the plurality of local weight gradients, decrypt the encrypted plurality of local weight gradients at the plurality of local computers.

In various examples, the compression and encryption module 32 is configured to, such as before delivering the plurality of local bias gradients, encrypt the plurality of local bias gradients at the plurality of local computers, and, such as after delivering the plurality of local bias gradients, decrypt the encrypted plurality of local bias gradients at the central computer. In some examples, the compression and encryption module 32 is configured to, such as before delivering the plurality of local bias gradients, encrypt the plurality of local bias gradients at the plurality of local computers, and, such as after delivering the plurality of local bias gradients, decrypt the encrypted plurality of local bias gradients at the plurality of local computers.

In various embodiments, the compression and encryption module 32 is configured to, such as before delivering the plurality of local parameter, compress the plurality of local parameter at the plurality of local computers, and, such as after delivering the plurality of local parameter, decompress the compressed plurality of local parameter at the central computer. In some examples, the compression and encryption module 32 is configured to, such as before delivering the plurality of local parameter, compress the plurality of local parameter at the plurality of local computers, and, such as after delivering the plurality of local parameter, decompress the compressed plurality of local parameter at the plurality of local computers.

In various examples, the compression and encryption module 32 is configured to, such as before delivering the plurality of local weights, compress the plurality of local weights at the plurality of local computers, and, such as after delivering the plurality of local weights, decompress the compressed plurality of local weights at the central computer. In some examples, the compression and encryption module 32 is configured to, such as before delivering the plurality of local weights, compress the plurality of local weights at the plurality of local computers; and, such as after delivering the plurality of local weights, decompress the compressed plurality of local weights gradients at the plurality of local computers.

In various examples, the compression and encryption module 32 is configured to, such as before delivering the plurality of local biases, compress the plurality of local biases at the plurality of local computers, and, such as after delivering the plurality of local biases, decompress the compressed plurality of local biases at the central computer. In some examples, the compression and encryption module 32 is configured to, such as before delivering the plurality of local biases, compress the plurality of local biases at the plurality of local computers, and, such as after delivering the plurality of local biases, decompress the compressed plurality of local biases at the plurality of local computers.

In various embodiments, the compression and encryption module 32 is configured to, such as before delivering the plurality of local parameters, encrypt the plurality of local parameters at the plurality of local computers, and, such as after delivering the plurality of local parameters, decrypt the encrypted plurality of local parameters at the central computer. In some examples, the compression and encryption module 32 is configured to, such as before delivering the plurality of local parameters, encrypt the plurality of local parameters at the plurality of local computers, and, such as after delivering the plurality of local parameters, decrypt the encrypted plurality of local parameters at the plurality of local computers.

In various examples, the compression and encryption module 32 is configured to, such as before delivering the plurality of local weights, encrypt the plurality of local weights at the plurality of local computers, and, such as after delivering the plurality of local weights, decrypt the encrypted plurality of local weights at the central computer. In some examples, the compression and encryption module 32 is configured to, such as before delivering the plurality of local weights, encrypt the plurality of local weights at the plurality of local computers; and, such as after delivering the plurality of local weights, decrypt the encrypted plurality of local weights at the plurality of local computers.

In various examples, the compression and encryption module 32 is configured to, such as before delivering the plurality of local biases, encrypt the plurality of local biases at the plurality of local computers, and, such as after delivering the plurality of local biases, decrypt the encrypted plurality of local biases at the central computer. In some examples, the compression and encryption module 32 is configured to, such as before delivering the plurality of local biases, encrypt the plurality of local biases at the plurality of local computers, and, such as after delivering the plurality of local biases, decrypt the encrypted plurality of local biases at the plurality of local computers.

Figure 2A:
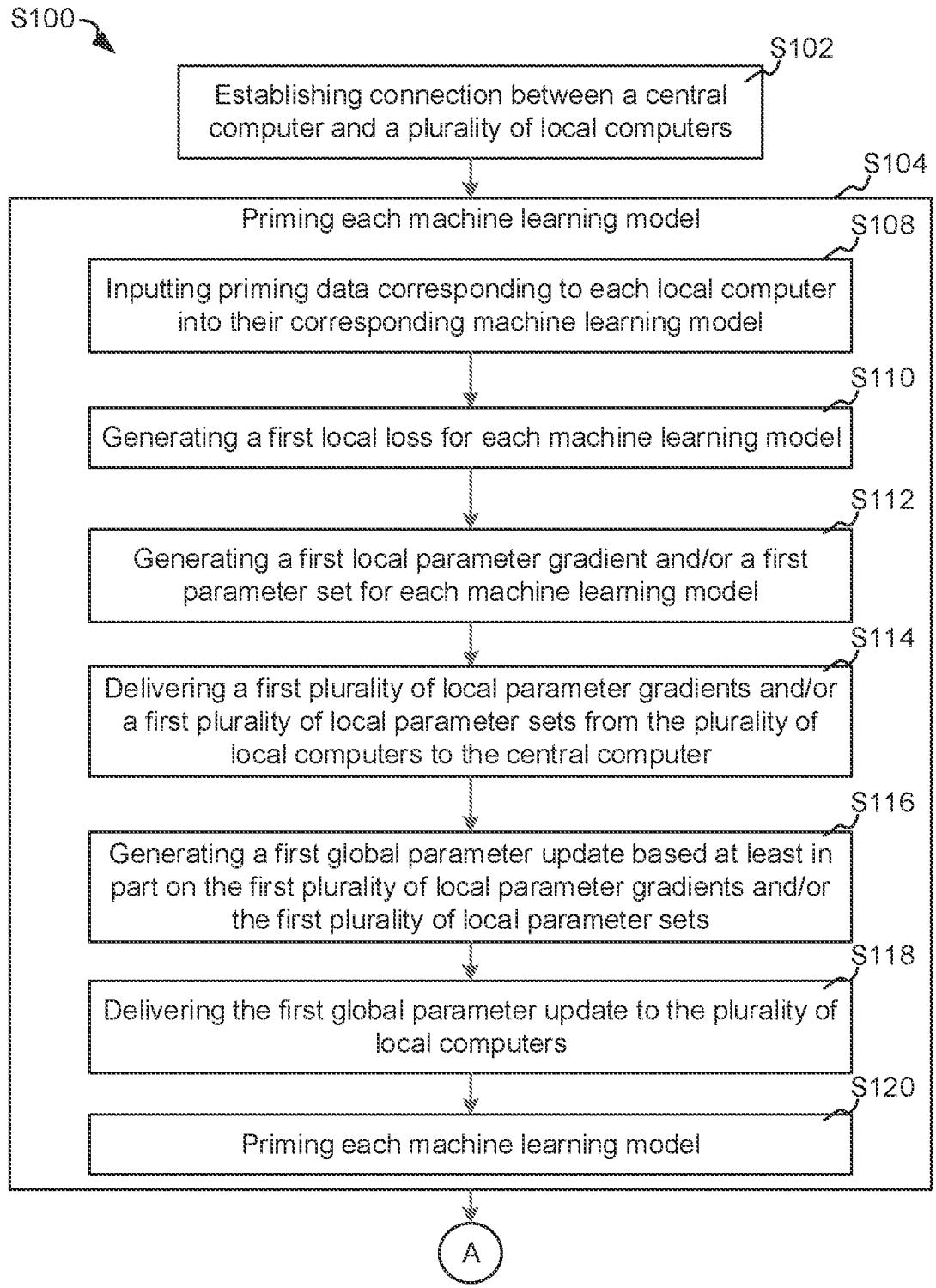
FIGS. 2A and 2B are simplified diagrams showing a method for enhancing a centralized distributed medical network, according to some embodiments.
Figure 2B:
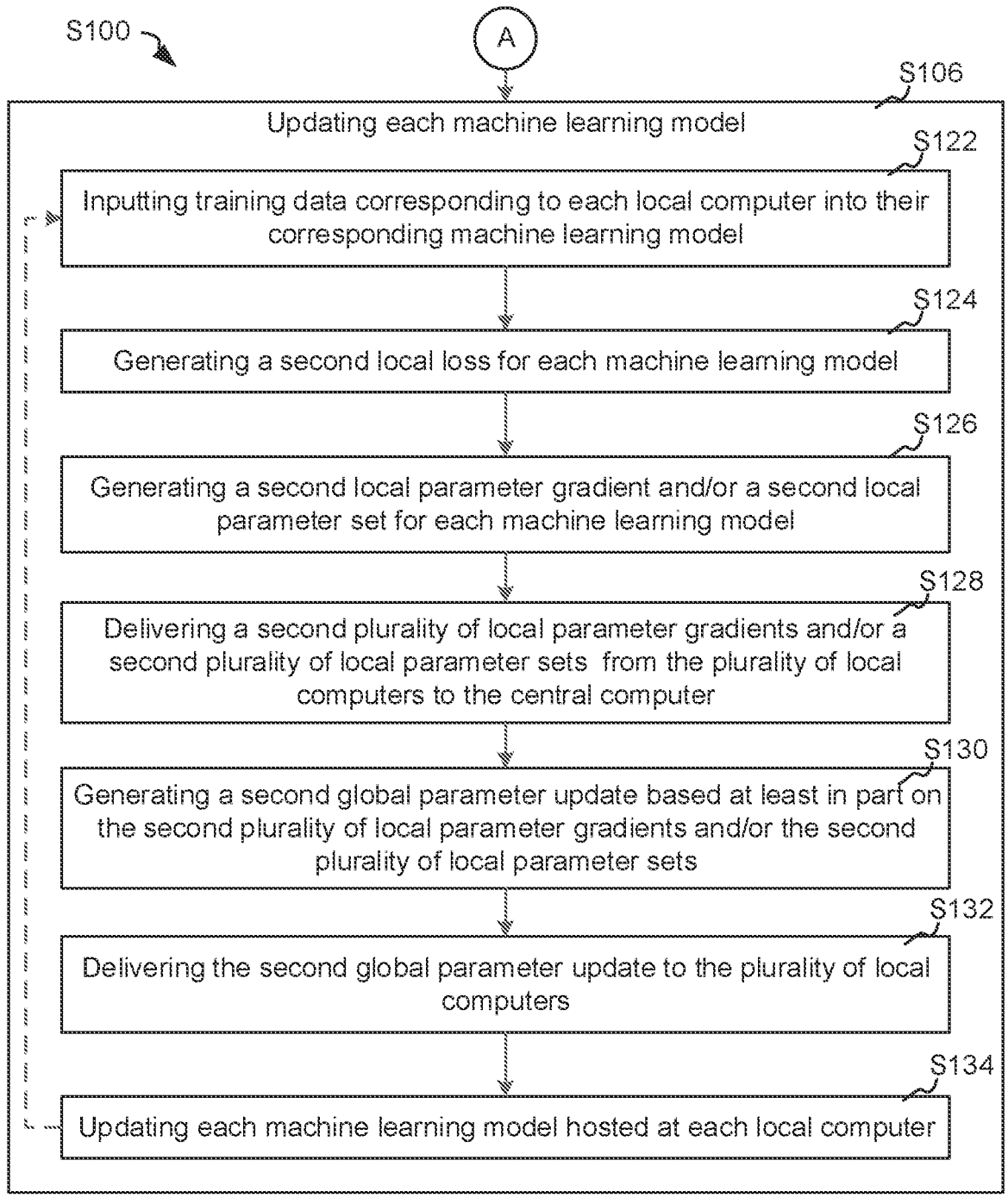

FIGS. 2A and 2B are simplified diagrams showing a method for enhancing a centralized distributed medical network, according to some embodiments. This diagram is merely an example, which should not unduly limit the scope of the claims. One of ordinary skill in the art would recognize many variations, alternatives, and modifications. In various examples, the method S100 is for enhancing a centralized distributed medical network including a central computer and a plurality of local computers, where each local computer of the plurality of local computers hosts a machine learning model configured with an active parameter set. In certain examples, the method S100 is implemented by the system 10 of FIG. 1. In some examples, the method S100 includes a process S102 of establishing connection between a central computer and a plurality of local computers, a process S104 of priming each machine learning model, and a process S106 of updating each machine learning model. Although the above has been shown using a selected group of processes for the method, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In various embodiments, the process S102 of establishing connection between a central computer and a plurality of local includes establishing a wireless and/or a wired connection between the central computer and the plurality of local computers. In certain examples, establishing connection between the central computer and the plurality of local includes establishing a data transfer connection for sharing, transferring, transmitting, and/or communicating data between the central computer and the plurality of local computers.

In various embodiments, the process S104 of priming each machine learning model includes a process S108 of inputting priming data corresponding to each local computer into their corresponding machine learning model, a process S110 of generating a first local loss for each machine learning model, a process S112 of generating a first local parameter gradient and/or a first local parameter set for each machine learning model, a process S114 of delivering a first plurality of local parameter gradients and/or a first plurality of local parameter sets from the plurality of local computers to the central computer, a process S116 of generating a first global parameter update based at least in part on the first plurality of local parameter gradients and/or the first plurality of local parameter sets, a process S118 of delivering the first global parameter update to the plurality of local computers, and a process S120 of priming each machine learning model hosted at each local computer. Although the above has been shown using a selected group of processes for process S104, there can be many alternatives, modifications, and variations. For example, some of the processes may be expanded and/or combined. Other processes may be inserted to those noted above. Some processes may be removed.

Depending upon the embodiment, the sequence of processes may be interchanged with others replaced.

In various embodiments, the process S108 of inputting priming data includes inputting a first priming data into a first machine learning model hosted at a first local computer of the plurality of local computers, inputting a second priming data into a second machine learning model hosted at a second local computer of the plurality of local computers, . . . , and inputting a $N^{th}$ priming data into a $N^{th}$ machine learning model hosted at a $N^{th}$ local computer of the plurality of local computers. In some examples, the priming data inputted into each machine learning model is different. In some examples, the training data inputted into each machine learning model is local data present (e.g., stored locally) with each local computer.

In various embodiments, the process S110 of generating a first local loss for each machine learning model includes generating a plurality of first local losses by at least generating a first local loss for each machine learning model hosted at the plurality of local computers. In various examples, generating the first local loss is based at least in part on the priming data, such as further based in part on one or more ground truths corresponding to the priming data.

In various embodiments, the process S112 of generating a first local parameter gradient and/or a first local parameter set for each machine learning model includes generating a first local weight gradient for each machine learning model hosted by its corresponding local computer. For example, generating a first local weight gradient includes generating first local weight gradient including one or more zeros for each machine learning model hosted by its corresponding local computer. In some examples, a first local weight gradient including one or more zeros, when backpropagated into the one or more model layers of the machine learning model, help guide the changing of one or more parameters of the machine learning model, such as during a priming process. In some examples, generating a first local parameter gradient for each machine learning model includes generating a first local bias gradient for each machine learning model hosted by its corresponding local computer. For example, generating a first local bias gradient includes generating a first local bias gradient for each machine learning model hosted by its corresponding local computer. In some examples, a first local bias gradient including one or more zeros, when backpropagated into the one or more model layers of the machine learning model, help guide the changing of one or more parameters of the machine learning model, such as during a priming process.

In various embodiments, the process S112 of generating a first local parameter gradient and/or a first local parameter set for each machine learning model includes generating a first local set of weights for each machine learning model hosted by its corresponding local computer. In some examples, the process S112 of generating a first local parameter gradient and/or a first local parameter set for each machine learning model includes generating a first local set of biases for each machine learning model hosted by its corresponding local computer.

In various embodiments, the process S114 of delivering a first plurality of local parameter gradients and/or a first plurality of parameter sets from the plurality of local computers to the central computer includes delivering a first local parameter gradient from a first local computer to the central computer, a second local parameter gradient from a second local computer to the central computer, . . . , and a $N^{th}$ local parameter gradient from the $N^{th}$ local computer to the central computer. In various examples, the process S114 of delivering a first plurality of local parameter gradients and/or a first plurality of parameter sets includes delivering a first plurality of local weight gradients from the plurality of local computers to a central computer of the distributed medical network. For example, delivering a first plurality of local weight gradients includes delivering a first local weight gradient from a first local computer to the central computer, a second local weight gradient from a second local computer to the central computer, . . . , and a $N^{th}$ local weight gradient from the $N^{th}$ local computer to the central computer. In various examples, the process S114 of delivering a first plurality of local parameter gradients and/or a first plurality of parameter sets includes delivering a first plurality of local bias gradients from the plurality of local computers to a central computer of the distributed medical network. For example, delivering a first plurality of local bias gradients includes delivering a first local bias gradient from a first local computer to the central computer, a second local bias gradient from a second local computer to the central computer, . . . , and a $N^{th}$ local bias gradient from the $N^{th}$ local computer to the central computer.

In various embodiments, the process S114 of delivering a first plurality of local parameter gradients and/or a first plurality of parameter sets from the plurality of local computers to the central computer includes delivering a first local parameter set from a first local computer to the central computer, a second local parameter set from a second local computer to the central computer, . . . , and a $N^{th}$ local parameter set from the $N^{th}$ local computer to the central computer. In various examples, the process S114 of delivering a first plurality of local parameter gradients and/or a first plurality of parameter sets includes delivering a first plurality of local sets of weights from the plurality of local computers to a central computer of the distributed medical network. For example, delivering a first plurality of local sets of weights includes delivering a first local set of weights from a first local computer to the central computer, a second local set of weights from a second local computer to the central computer, . . . , and a $N^{th}$ local set of weights from the $N^{th}$ local computer to the central computer. In various examples, the process S114 of delivering a first plurality of local parameter gradients and/or a first plurality of parameter sets includes delivering a first plurality of local sets of biases from the plurality of local computers to a central computer of the distributed medical network. For example, delivering a first plurality of local sets of biases includes delivering a first local set of biases from a first local computer to the central computer, a second local set of biases from a second local computer to the central computer, . . . , and a $N^{th}$ local set of biases from the $N^{th}$ local computer to the central computer.

In various embodiments, the process S116 of generating a first global parameter update based at least in part on the first plurality of local parameter gradients and/or the first plurality of local parameter sets includes generating a first plurality of global parameter gradients, such as by averaging the first plurality of local parameter gradients. In certain examples, the first global parameter update corresponds to the first plurality of global parameter gradients. In certain examples, the first plurality of global parameter gradients corresponds to the first plurality of local parameter gradients. In some examples, generating the first global parameter update includes generating the first global parameter update by at least backpropagating the first plurality of global parameter gradients into the one or more model layers of the machine learning model (e.g., at the central computer). In some examples, generating the first global parameter update includes generating the first global parameter update at the central computer.

In some examples, the process S116 of generating the first global parameter update includes generating a first global weight update based at least in part on a first plurality of local weight gradients. For example, generating a first global weight update includes generating the first global weight update by at least averaging the first plurality of local weight gradients. In certain examples, each first local weight gradient of the first plurality of local weight gradients corresponds to a first local loss and a corresponding local computer. For example, each first local weight gradient of the first plurality of local weight gradients corresponds to a local computer of the plurality of local computers.

In some examples, the process S116 of generating the first global parameter update includes generating a first global bias update based at least in part on a first plurality of local bias gradients. For example, generating a first global bias update includes generating the first global bias update by at least averaging the first plurality of local bias gradients. In certain examples, each first local bias gradient of the first plurality of local bias gradients corresponds to a first local loss and a corresponding local computer. For example, each first local bias gradient of the first plurality local bias gradients corresponds to a local computer of the plurality of local computers.

In various embodiments, the process S116 of generating a first global parameter update based at least in part on the first plurality of local parameter sets and/or the first plurality of local parameter sets includes generating a first plurality of global parameter sets, such as by averaging the first plurality of local parameter sets. In certain examples, the first global parameter update corresponds to the first plurality of global parameter sets. In certain examples, the first plurality of global parameter sets corresponds to the first plurality of local parameter sets. In some examples, generating the first global parameter update includes generating the first global parameter update at the central computer.

In some examples, the process S116 of generating the first global parameter update includes generating a first global weight update based at least in part on a first plurality of local sets of weights. For example, generating a first global weight update includes generating the first global weight update by at least averaging the first plurality of local sets of weights. In certain examples, each first local set of weights of the first plurality of local sets of weights corresponds to a first local loss and a corresponding local computer. For example, each first local set of weights of the first plurality of local sets of weights corresponds to a local computer of the plurality of local computers.

In some examples, the process S116 of generating the first global parameter update includes generating a first global weight update based at least in part on a first plurality of local sets of biases. For example, generating a first global weight update includes generating the first global weight update by at least averaging the first plurality of local sets of biases. In certain examples, each first local set of biases of the first plurality of local sets of biases corresponds to a first local loss and a corresponding local computer. For example, each first local set of biases of the first plurality of local sets of biases corresponds to a local computer of the plurality of local computers.

In various embodiments, the process S118 of delivering the first global parameter update to the plurality of local computers includes delivering the first global parameter update from the central computer to each local computer of the plurality of local computers. In various embodiments, the process S118 of delivering the first global parameter update to the plurality of local computers includes delivering the first global weight update from the central computer to each local computer of the plurality of local computers. In various embodiments, the process S118 of delivering the first global parameter update to the plurality of local computers includes delivering the first global bias update from the central computer to each local computer of the plurality of local computers.

In various embodiments, the process S120 of priming each machine learning model hosted at each local computer includes updating each machine learning model hosted at each local computer of the plurality of local computers by at least updating their corresponding active parameter set based at least in part on the first global parameter update, the first global weight update, and/or the first global bias update.

In various embodiments, the process S106 of updating each machine learning model includes a process S122 of inputting training data corresponding to each local computer into their corresponding machine learning model, a process S124 of generating a second local loss for each machine learning model, a process S126 of generating a second local parameter gradient and/or a second local parameter set for each machine learning model, a process S128 of delivering a second plurality of local parameter gradients and/or a second plurality of local parameter sets from the plurality of local computers to the central computer, a process S130 of generating a second global parameter update based at least in part on the second plurality of local parameter gradients and/or the second plurality of local parameter sets, a process S132 of delivering the second global parameter update to the plurality of local computers, and a process S134 of updating each machine learning model hosted at each local computer. Although the above has been shown using a selected group of processes for process S106, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In various embodiments, the process S122 of inputting training data includes inputting a first training data into a first machine learning model hosted at a first local computer of the plurality of local computers, inputting a second training data into a second machine learning model hosted at a second local computer of the plurality of local computers, . . . , and inputting a $N^{th}$ training data into a $N^{th}$ machine learning model hosted at a $N^{th}$ local computer of the plurality of local computers. In some examples, the training data inputted into each machine learning model is different. In some examples, the training data inputted into each machine learning model is local data present (e.g., stored locally) with each local computer. In certain examples, the training data is the same as the priming data.

In various embodiments, the process S124 of generating a second local loss for each machine learning model includes generating a second plurality of local losses by at least generating a second local loss for each machine learning model hosted at the plurality of local computers. In various examples, generating the second local loss is based at least in part on the training data, such as further based in part on one or more ground truths corresponding to the training data.

In various embodiments, the process S126 of generating a second local parameter gradient and/or a second local parameter set for each machine learning model includes generating a second local weight gradient for each machine learning model hosted by its corresponding local computer. For example, generating the second local weight gradient includes generating a non-zero second local weight gradient for each machine learning model hosted by its corresponding local computer. In some examples, a non-zero second local weight gradient, when backpropagated into the one or more model layers of the machine learning model, help guide the changing of one or more parameters of the machine learning model, such as during a training process.

In some examples, the process S126 of generating a second local parameter gradient and/or a second local parameter set for each machine learning model includes generating a second local bias gradient for each machine learning model hosted by its corresponding local computer. For example, generating a second local bias gradient includes generating a non-zero second local bias gradient for each machine learning model hosted by its corresponding local computer. In some examples, a non-zero local bias gradient, when backpropagated into the one or more model layers of the machine learning model, help guide the changing of one or more parameters of the machine learning model, such as during a training process.

In various embodiments, the process S126 of generating a second local parameter gradient and/or a second local parameter set for each machine learning model includes generating a second local set of weights for each machine learning model hosted by its corresponding local computer. In various examples, the process S126 of generating a second local parameter gradient and/or a second local parameter set for each machine learning model includes generating a second local set of biases for each machine learning model hosted by its corresponding local computer.

In various embodiments, the process S128 of delivering a second plurality of local gradient parameters and/or a second plurality of local parameter sets from the plurality of local computers to the central computer includes delivering a first local gradient parameter from a first local computer to the central computer, a second local gradient parameter from a second local computer to the central computer, . . . , and a $N^{th}$ local gradient parameter from the $N^{th}$ local computer to the central computer.

In various examples, the process S128 of delivering a second plurality of local gradient parameters and/or a second plurality of local parameter sets includes delivering a second plurality of local weight gradients from the plurality of local computers to a central computer of the distributed medical network. For example, delivering a second plurality of local weight gradients includes delivering a first local weight gradient from a first local computer to the central computer, a second local weight gradient from a second local computer to the central computer, . . . , and a $N^{th}$ local weight gradient from the $N^{th}$ local computer to the central computer.

In various examples, the process S128 of delivering a second plurality of local gradient parameters and/or a second plurality of local parameter sets includes delivering a second plurality of local bias gradients from the plurality of local computers to a central computer of the distributed medical network. For example, delivering a second plurality of local bias gradients includes delivering a first local bias gradient from a first local computer to the central computer, a second local bias gradient from a second local computer to the central computer, . . . , and a $N^{th}$ local bias gradient from the $N^{th}$ local computer to the central computer.

In various embodiments, the process S128 of delivering a second plurality of local gradient parameters and/or a second plurality of local parameter sets from the plurality of local computers to the central computer includes delivering a first local parameter set from a first local computer to the central computer, a second local parameter set from a second local computer to the central computer, . . . , and a $N^{th}$ local parameter set from the $N^{th}$ local computer to the central computer.

In various examples, the process S128 of delivering a second plurality of local gradient parameters and/or a second plurality of local parameter sets includes delivering a second plurality of local sets of weights from the plurality of local computers to a central computer of the distributed medical network. For example, delivering a second plurality of local sets of weights includes delivering a first local set of weights from a first local computer to the central computer, a second local set of weights from a second local computer to the central computer, . . . , and a $N^{th}$ local set of weights from the $N^{th}$ local computer to the central computer.

In various examples, the process S128 of delivering a second plurality of local gradient parameters and/or a second plurality of local parameter sets includes delivering a second plurality of local sets of biases from the plurality of local computers to a central computer of the distributed medical network. For example, delivering a second plurality of local sets of biases includes delivering a first local set of biases from a first local computer to the central computer, a second local set of biases from a second local computer to the central computer, . . . , and a $N^{th}$ local set of biases from the $N^{th}$ local computer to the central computer.

In various embodiments, the process S130 of generating a second global parameter update based at least in part on the second plurality of local parameter gradients and/or the second plurality of local parameter sets includes generating a second plurality of global parameter gradients, such as by averaging the second plurality of local parameter gradients. In certain examples, the second global parameter update corresponds to the second plurality of global parameter gradients. In certain examples, the second plurality of global parameter gradients corresponds to the second plurality of local parameter gradients. In some examples, generating the second global parameter update includes generating the second global parameter update by at least backpropagating the second plurality of global parameter gradients into the one or more model layers of the machine learning model (e.g., at the central computer). In some examples, generating the second global parameter update includes generating the second global parameter update at the central computer.

In some examples, the process S130 of generating the second global parameter update includes generating a second global weight update based at least in part on a second plurality of local weight gradients. For example, generating a second global weight update includes generating the second global weight update by at least averaging the second plurality of local weight gradients. In certain examples, each second local weight gradient of the second plurality of local weight gradients corresponds to a second local loss and a corresponding local computer. For example, each second local weight gradient of the plurality of second local weight gradients corresponds to a local computer of the plurality of local computers.

In some examples, the process S130 of generating the second global parameter update includes generating a second global bias update based at least in part on a second plurality of local bias gradients. For example, generating a second global bias update includes generating the second global bias update by at least averaging the second plurality of local bias gradients. In certain examples, each second local bias gradient of the plurality of second local bias gradients corresponds to a second local loss and a corresponding local computer. For example, each second local bias gradient of the plurality of second local bias gradients corresponds to a local computer of the plurality of local computers.

In various embodiments, the process S130 of generating a second global parameter update based at least in part on the second plurality of local parameter gradients and/or the second plurality of local parameter sets includes generating a second plurality of global parameter sets, such as by averaging the second plurality of local parameter sets. In certain examples, the second global parameter update corresponds to the second plurality of global parameter sets. In certain examples, the second plurality of global parameter sets corresponds to the second plurality of local parameter sets. In some examples, generating the second global parameter update includes generating the second global parameter update at the central computer.

In some examples, the process S130 of generating the second global parameter update includes generating a second global weight update based at least in part on a second plurality of local sets of weights. For example, generating a second global weight update includes generating the second global weight update by at least averaging the second plurality of local sets of weights. In certain examples, each second local set of weights of the second plurality of local sets of weights corresponds to a second local loss and a corresponding local computer. For example, each second local set of weights of the plurality of second local sets of weights corresponds to a local computer of the plurality of local computers.

In some examples, the process S130 of generating the second global parameter update includes generating a second global bias update based at least in part on a second plurality of local sets of biases. For example, generating a second global bias update includes generating the second global bias update by at least averaging the second plurality of local sets of biases. In certain examples, each second local set of biases of the second plurality of local sets of biases corresponds to a second local loss and a corresponding local computer. For example, each second local set of biases of the plurality of second local sets of biases corresponds to a local computer of the plurality of local computers.

In various embodiments, the process S132 of delivering the second global parameter update to the plurality of local computers includes delivering the second global parameter update from the central computer to each local computer of the plurality of local computers. In various examples, the process S106 of updating each machine learning model further includes delivering the second global weight update from the central computer to each local computer of the plurality of local computers. In various examples, the process S106 of updating each machine learning model further includes delivering the second global bias update from the central computer to each local computer of the plurality of local computers.

In various embodiments, the process S134 of updating each machine learning model hosted at each local computer includes updating each machine learning model hosted at each local computer of the plurality of local computers by at least updating their corresponding active parameter set based at least in part on the second global parameter update, the second global weight update, and/or the second global bias update.

In certain embodiments, the process S106 of updating each machine learning model further includes implementing a time out period on the central computer such that the central computer is configured to reject receipt of local parameter gradient during the time out period. Alternatively, in certain embodiments, the process S106 of updating each machine learning model further includes implementing a time out period on the central computer such that the central computer is configured to only receive local parameter gradient during the time out period.

In certain embodiments, the process S106 of updating each machine learning model further includes, before delivering the second plurality of local parameter gradients, compressing the second plurality of local parameter gradients at the plurality of local computers, and after delivering the second plurality of local parameter gradients, decompressing the compressed second plurality of local parameter gradients at the central computer.

In certain embodiments, the process S106 of updating each machine learning model further includes, before delivering the second plurality of local weight gradients, compressing the second plurality of local weight gradients at the plurality of local computers, and after delivering the second plurality of local weight gradients, decompressing the compressed second plurality of local weight gradients at the central computer.

In certain embodiments, the process S106 of updating each machine learning model further includes, before delivering the second plurality of local bias gradients, compressing the second plurality of local bias gradients at the plurality of local computers, and after delivering the second plurality of local bias gradients, decompressing the compressed second plurality of local bias gradients at the central computer.

In certain embodiments, the process S106 of updating each machine learning model further includes, before delivering the second plurality of local parameter gradients, encrypting the second plurality of local parameter gradients at the plurality of local computers, and after delivering the second plurality of local parameter gradients, decrypting the compressed second plurality of local parameter gradients at the central computer.

In certain embodiments, the process S106 of updating each machine learning model further includes, before delivering the second plurality of local weight gradients, encrypting the second plurality of local weight gradients at the plurality of local computers, and after delivering the second plurality of local weight gradients, decrypting the compressed second plurality of local weight gradients at the central computer.

In certain embodiments, the process S106 of updating each machine learning model further includes, before delivering the second plurality of local bias gradients, encrypting the second plurality of local bias gradients at the plurality of local computers, and after delivering the second plurality of local bias gradients, decrypting the compressed second plurality of local bias gradients at the central computer.

In certain embodiments, the process S106 of updating each machine learning model further includes implementing a time out period on the central computer such that the central computer is configured to reject receipt of local parameters during the time out period. Alternatively, in certain embodiments, the process S106 of updating each machine learning model further includes implementing a time out period on the central computer such that the central computer is configured to only receive local parameters during the time out period.

In certain embodiments, the process S106 of updating each machine learning model further includes, before delivering the second plurality of local parameters, compressing the second plurality of local parameters at the plurality of local computers, and after delivering the second plurality of local parameters, decompressing the compressed second plurality of local parameters at the central computer.

In certain embodiments, the process S106 of updating each machine learning model further includes, before delivering the second plurality of local weights, compressing the second plurality of local weights at the plurality of local computers, and after delivering the second plurality of local weights, decompressing the compressed second plurality of local weights at the central computer.

In certain embodiments, the process S106 of updating each machine learning model further includes, before delivering the second plurality of local biases, compressing the second plurality of local biases at the plurality of local computers, and after delivering the second plurality of local biases, decompressing the compressed second plurality of local biases at the central computer.

In certain embodiments, the process S106 of updating each machine learning model further includes, before delivering the second plurality of local parameters, encrypting the second plurality of local parameters at the plurality of local computers, and after delivering the second plurality of local parameters, decrypting the compressed second plurality of local parameters at the central computer.

In certain embodiments, the process S106 of updating each machine learning model further includes, before delivering the second plurality of local weights, encrypting the second plurality of local weights at the plurality of local computers, and after delivering the second plurality of local weights, decrypting the compressed second plurality of local weights at the central computer.

In certain embodiments, the process S106 of updating each machine learning model further includes, before delivering the second plurality of local biases, encrypting the second plurality of local biases at the plurality of local computers, and after delivering the second plurality of local biases, decrypting the compressed second plurality of local biases at the central computer.

Figure 3A:
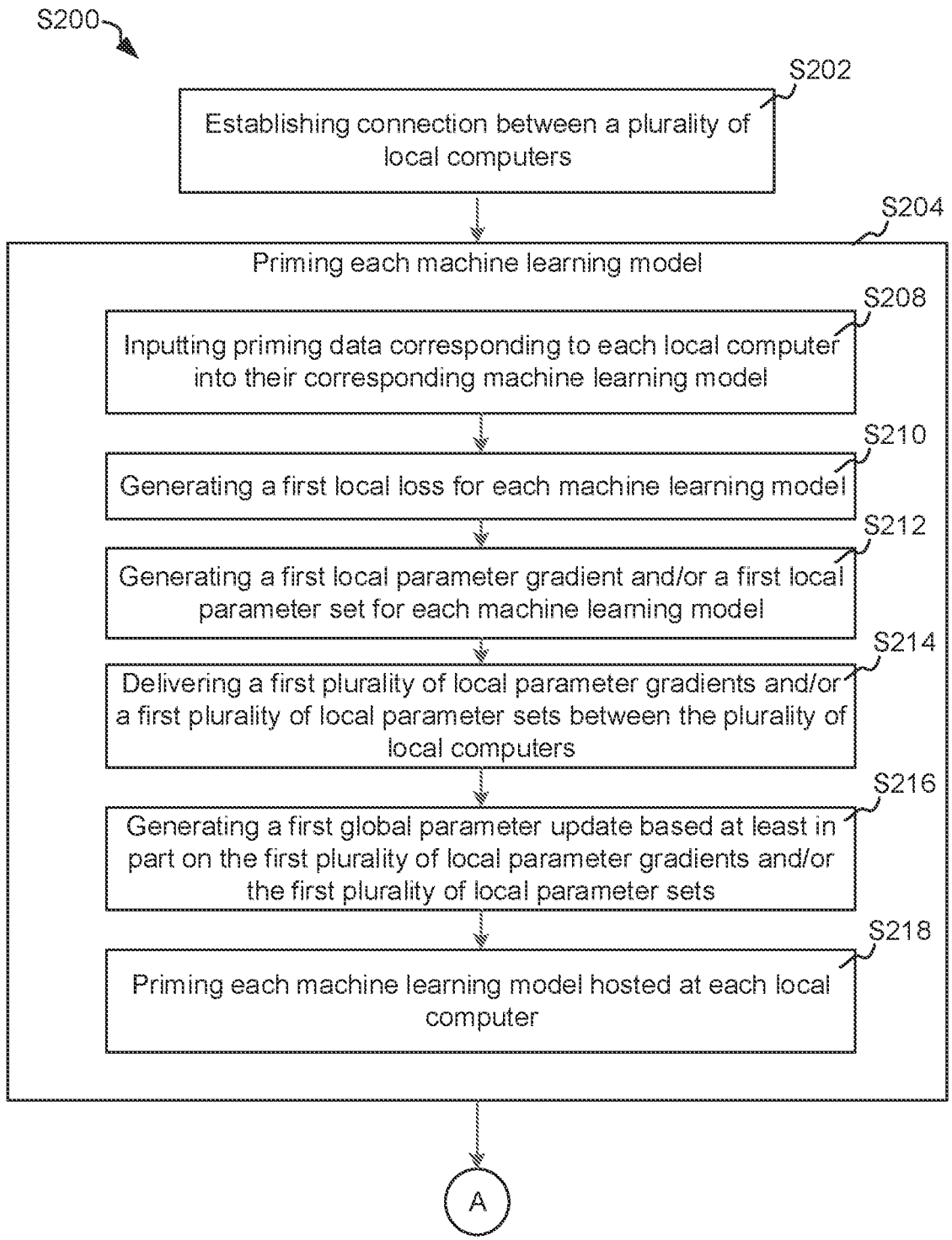
FIGS. 3A and 3B are simplified diagrams showing a method for enhancing a decentralized distributed medical network, according to some embodiments.
Figure 3B:
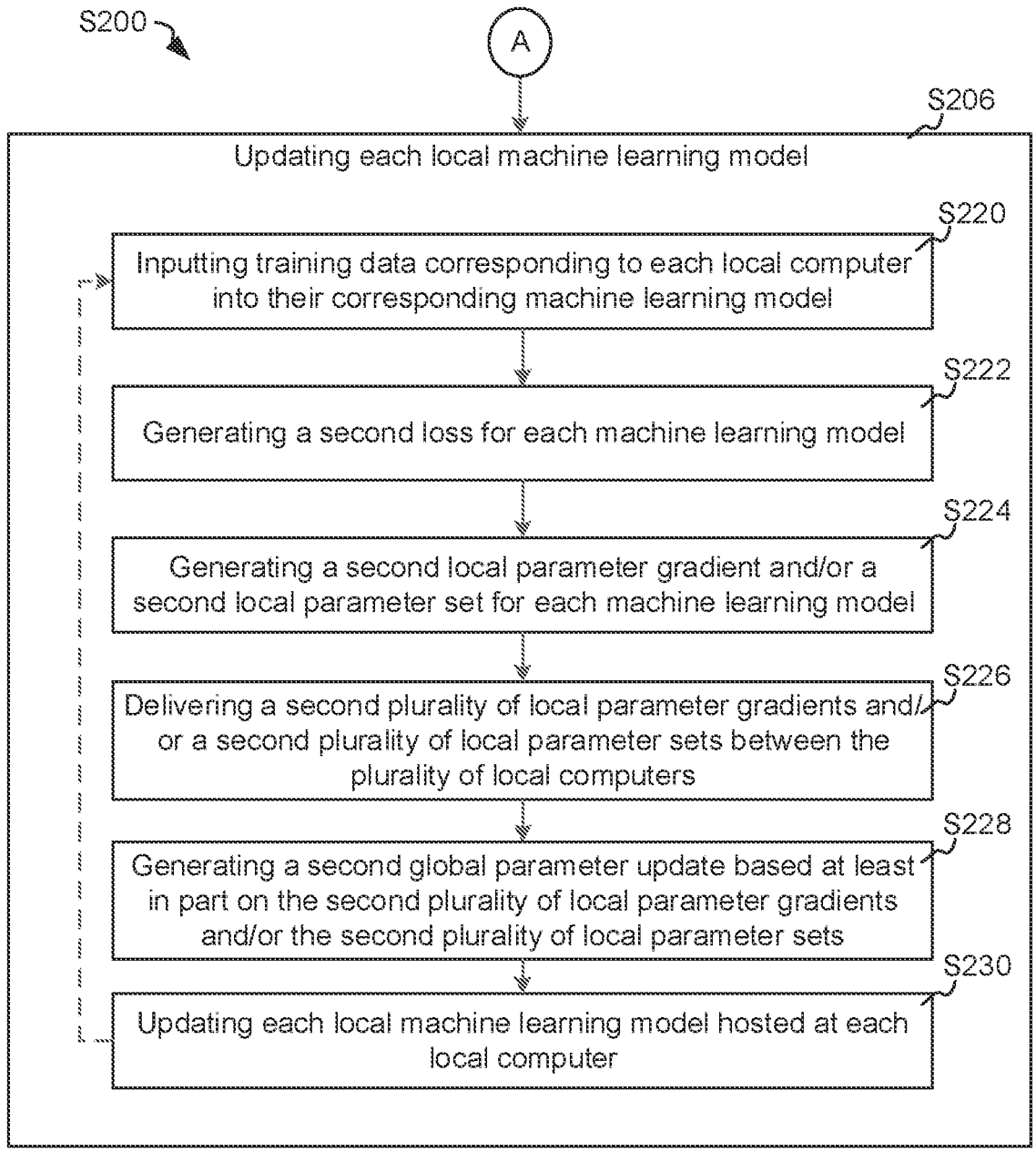

FIGS. 3A and 3B are simplified diagrams showing a method for enhancing a decentralized distributed medical network, according to some embodiments. This diagram is merely an example, which should not unduly limit the scope of the claims. One of ordinary skill in the art would recognize many variations, alternatives, and modifications. In various examples, the method S200 is for enhancing a decentralized distributed medical network including a plurality of local computers, where each local computer of the plurality of local computers hosts a machine learning model configured with an active parameter set. In certain examples, the method S200 is implemented by the system 10 of FIG. 1. In some examples, the method S200 includes a process S202 of establishing connection between a plurality of local computers, a process S204 of priming each machine learning model, and a process S206 of updating each machine learning model. Although the above has been shown using a selected group of processes for the method, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In various embodiments, the process S202 of establishing connection between a plurality of local includes establishing a wireless and/or a wired connection between the plurality of local computers. In certain examples, establishing connection between a plurality of local includes establishing a data transfer connection for sharing, transferring, transmitting, and/or communicating data between the plurality of local computers.

In various embodiments, the process S204 of priming each machine learning model includes a process S208 of inputting priming data corresponding to each local computer into their corresponding machine learning model, a process S210 of generating a first local loss for each machine learning model, a process S212 of generating a first local parameter gradient and/or a first local parameter set for each machine learning model, a process S214 of delivering a first plurality of local parameter gradients and/or a first plurality of local parameter sets between the plurality of local computers, a process S216 of generating a first global parameter update based at least in part on the first plurality of local parameter gradients and/or the first plurality of local parameter sets, and a process S218 of priming each machine learning model hosted at each local computer. Although the above has been shown using a selected group of processes for process S204, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In various embodiments, the process S208 of inputting priming data includes inputting a first priming data into a first machine learning model hosted at a first local computer of the plurality of local computers, inputting a second priming data into a second machine learning model hosted at a second local computer of the plurality of local computers, ..., and inputting a $N^{th}$ priming data into a $N^{th}$ machine learning model hosted at a $N^{th}$ local computer of the plurality of local computers. In some examples, the priming data inputted into each machine learning model is local data present (e.g., stored locally) with each local computer. In some examples, the priming data inputted into each machine learning model is different.

In various embodiments, the process S210 of generating a first local loss for each machine learning model includes generating a plurality of first local losses by at least generating a first local loss for each machine learning model hosted at the plurality of local computers. In various examples, generating the first local loss is based at least in part on the priming data, such as further based in part on one or more ground truths corresponding to the priming data.

In various embodiments, the process S212 of generating a first local parameter gradient and/or a first local parameter set for each machine learning model includes generating a first local weight gradient for each machine learning model hosted by its corresponding local computer. For example, generating a first local weight gradient includes generating first local weight gradient including one or more zeros for each machine learning model hosted by its corresponding local computer. In some examples, a first local weight gradient including one or more zeros, when backpropagated into the one or more model layers of the machine learning model, help guide the changing of one or more parameters of the machine learning model, such as during a priming process.

In various embodiments, the process S212 of generating a first local parameter gradient and/or a first local parameter set for each machine learning model includes generating a first local bias gradient for each machine learning model hosted by its corresponding local computer. For example, generating a first local bias gradient includes generating a first local bias gradient for each machine learning model hosted by its corresponding local computer. In some examples, a first local bias gradient including one or more zeros, when backpropagated into the one or more model layers of the machine learning model, help guide the changing of one or more parameters of the machine learning model, such as during a priming process.

In various embodiments, the process S212 of generating a first local parameter gradient and/or a first local parameter set for each machine learning model includes generating a first local set of weights for each machine learning model hosted by its corresponding local computer. In various examples, the process S212 of generating a first local parameter gradient and/or a first local parameter set for each machine learning model includes generating a first local set of biases for each machine learning model hosted by its corresponding local computer.

In various embodiments, the process S214 of delivering a first plurality of local parameter gradients and/or a first plurality of local parameter sets between the plurality of local computers includes delivering the first local parameter gradient corresponding to each local computer with all other local computers of the plurality of local computers. For example, delivering a first plurality of local parameter gradients includes delivering a first local parameter gradient from a first local computer to a second local computer, a third local computer, . . . , and a $N^{th}$ local computer.

In various embodiments, the process S214 of delivering a first plurality of local parameter gradients and/or a first plurality of local parameter sets includes delivering a first plurality of local weight gradients between the plurality of local computers, such as including delivering the first local weight gradient corresponding to each local computer with all other local computers of the plurality of local computers. For example, delivering a first plurality of local weight gradients includes delivering a first local weight gradient from a first local computer to a second local computer, a third local computer, . . . , and a $N^{th}$ local computer.

In various embodiments, the process S214 of delivering a first plurality of local parameter gradients includes delivering a first plurality of local bias gradients between the plurality of local computers, such as including delivering the first local bias gradient corresponding to each local computer with all other local computers of the plurality of local computers. For example, delivering a first plurality of local bias gradients includes delivering a first local bias gradient from a first local computer to a second local computer, a third local computer, . . . , and a $N^{th}$ local computer.

In various embodiments, the process S214 of delivering a first plurality of local parameter gradients and/or a first plurality of local parameter sets between the plurality of local computers includes delivering the first local parameter set corresponding to each local computer with all other local computers of the plurality of local computers. For example, delivering a first plurality of local parameter sets includes delivering a first local parameter set from a first local computer to a second local computer, a third local computer, . . . , and a $N^{th}$ local computer.

In various embodiments, the process S214 of delivering a first plurality of local parameter gradients and/or a first plurality of local parameter sets includes delivering a first plurality of local sets of weights between the plurality of local computers, such as including delivering the first local set of weight corresponding to each local computer with all other local computers of the plurality of local computers. For example, delivering a first plurality of local sets of weights includes delivering a first local set of weights from a first local computer to a second local computer, a third local computer, . . . , and a $N^{th}$ local computer.

In various embodiments, the process S214 of delivering a first plurality of local parameter gradients and/or a first plurality of local parameter sets includes delivering a first plurality of local sets of biases between the plurality of local computers, such as including delivering the first local set of bias corresponding to each local computer with all other local computers of the plurality of local computers. For example, delivering a first plurality of local sets of biases includes delivering a first local set of biases from a first local computer to a second local computer, a third local computer, . . . , and a $N^{th}$ local computer.

In various embodiments, the process S216 of generating a first global parameter update based at least in part on the first plurality of local parameter gradients and/or the first plurality of local parameter sets includes generating a first plurality of global parameter gradients, such as by averaging the first plurality of local parameter gradients. In certain examples, the first global parameter update corresponds to the first plurality of global parameter gradients. In certain examples, the first plurality of global parameter gradients corresponds to the first plurality of local parameter gradients. In some examples, generating the first global parameter update includes generating the first global parameter update by at least backpropagating the first plurality of global parameter gradients into the one or more model layers of the machine learning model (e.g., at each local computer). In some examples, generating the first global parameter update includes generating the first global parameter update at each local computer.

In some examples, the process S216 of generating the first global parameter update includes generating a first global weight update based at least in part on a first plurality of local weight gradients. For example, generating a first global weight update includes generating the first global weight update by at least averaging the first plurality of local weight gradients. In certain examples, each first local weight gradient of the first plurality of local weight gradients corresponds to a first local loss and a corresponding local computer. For example, each first local weight gradient of the plurality of first local weight gradients corresponds to a local computer of the plurality of local computers.

In some examples, the process S216 of generating the first global parameter update includes generating a first global bias update based at least in part on a first plurality of local bias gradients. For example, generating a first global bias update includes generating the first global bias update by at least averaging the first plurality of local bias gradients. In certain examples, each first local bias gradient of the plurality of first local bias gradients corresponds to a first local loss and a corresponding local computer. For example, each first local bias gradient of the plurality of first local bias gradients corresponds to a local computer of the plurality of local computers.

In various embodiments, the process S216 of generating a first global parameter update based at least in part on the first plurality of local parameter gradients and/or the first plurality of local parameter sets includes generating a first plurality of global parameter sets, such as by averaging the first plurality of local parameter sets. In certain examples, the first global parameter update corresponds to the first plurality of global parameter sets. In certain examples, the first plurality of global parameter sets corresponds to the first plurality of local parameter sets. In some examples, generating the first global parameter update includes generating the first global parameter update at each local computer.

In some examples, the process S216 of generating the first global parameter update includes generating a first global weight update based at least in part on a first plurality of local sets of weights. For example, generating a first global weight update includes generating the first global weight update by at least averaging the first plurality of local sets of weights. In certain examples, each first local set of weights of the first plurality of local sets of weights corresponds to a first local loss and a corresponding local computer. For example, each first local set of weights of the plurality of first local sets of weights corresponds to a local computer of the plurality of local computers.

In some examples, the process S216 of generating the first global parameter update includes generating a first global bias update based at least in part on a first plurality of local sets of biases. For example, generating a first global bias update includes generating the first global bias update by at least averaging the first plurality of local sets of biases. In certain examples, each first local set of biases of the first plurality of local sets of biases corresponds to a first local loss and a corresponding local computer. For example, each first local set of biases of the plurality of first local sets of biases corresponds to a local computer of the plurality of local computers.

In various embodiments, the process S218 of priming each machine learning model hosted at each local computer includes updating each machine learning model hosted at each local computer of the plurality of local computers by at least updating their corresponding active parameter set based at least in part on the first global parameter update, the first global weight update, and/or the first global bias update.

In various embodiments, the process S206 of updating each machine learning model includes a process S220 of inputting training data corresponding to each local computer into their corresponding machine learning model, a process S222 of generating a second local loss for each machine learning model, a process S224 of generating a second local parameter gradient and/or a second local parameter set for each machine learning model, a process S226 of delivering a second plurality of local parameter gradients and/or a second plurality of local parameter sets from the plurality of local computers to the central computer, a process S228 of generating a second global parameter update based at least in part on the second plurality of local parameter gradients and/or the second plurality of local parameter sets, and a process S230 of updating each machine learning model hosted at each local computer. Although the above has been shown using a selected group of processes for process S206, there can be many alternatives, modifications, and variations. For example, some of the processes may be expanded and/or combined. Other processes may be inserted to those noted above. Some processes may be removed. Depending upon the embodiment, the sequence of processes may be interchanged with others replaced.

In various embodiments, the process S220 of inputting training data includes inputting a first training data into a first machine learning model hosted at a first local computer of the plurality of local computers, inputting a second training data into a second machine learning model hosted at a second local computer of the plurality of local computers, . . . , and inputting a $N^{th}$ training data into a $N^{th}$ machine learning model hosted at a $N^{th}$ local computer of the plurality of local computers. In some examples, the training data inputted into each machine learning model is different.

In various embodiments, the process S222 of generating a second local loss for each machine learning model includes generating a second plurality of local losses by at least generating a second local loss for each machine learning model hosted at the plurality of local computers. In various examples, generating the second local loss is based at least in part on the training data, such as further based in part on one or more ground truths corresponding to the training data.

In various embodiments, the process S224 of generating a second local parameter gradient and/or a second local parameter set for each machine learning model includes generating a second local weight gradient for each machine learning model hosted by its corresponding local computer. For example, generating the second local weight gradient includes generating a non-zero second local weight gradient for each machine learning model hosted by its corresponding local computer. In some examples, a non-zero second local weight gradient, when backpropagated into the one or more model layers of the machine learning model, help guide the changing of one or more parameters of the machine learning model, such as during a training (e.g., enhancing) process.

In various embodiments, the process S224 of generating a second local parameter gradient and/or a second local parameter set for each machine learning model includes generating a second local bias gradient for each machine learning model hosted by its corresponding local computer. For example, generating a second local bias gradient includes generating a non-zero second local bias gradient for each machine learning model hosted by its corresponding local computer. In some examples, a non-zero local bias gradient, when backpropagated into the one or more model layers of the machine learning model, help guide the changing of one or more parameters of the machine learning model, such as during a training (e.g., enhancing) process.

In various embodiments, the process S224 of generating a second local parameter gradient and/or a second local parameter set for each machine learning model includes generating a second local set of weights for each machine learning model hosted by its corresponding local computer. In various examples, the process S224 of generating a second local parameter gradient and/or a second local parameter set for each machine learning model includes generating a second local set of biases for each machine learning model hosted by its corresponding local computer.

In various embodiments, the process S226 of delivering a second plurality of local parameter gradients and/or a second plurality of local parameter sets between the plurality of local computers includes delivering the second local parameter gradient corresponding to each local computer with all other local computers of the plurality of local computers. For example, delivering a second plurality of local parameter gradients includes delivering a second local parameter gradient from a first local computer to a second local computer, a third local computer, . . . , and a $N^{th}$ local computer.

In various examples, the process S226 of delivering a second plurality of local parameter gradients and/or a second plurality of local parameter sets between the plurality of local computers includes delivering a second plurality of local weight gradients between the plurality of local computers, such as including delivering the second local weight gradient corresponding to each local computer with all other local computers of the plurality of local computers. For example, delivering a second plurality of local weight gradients includes delivering a second local weight gradient from a first local computer to a second local computer, a third local computer, . . . , and a $N^{th}$ local computer.

In various examples, the process S226 of delivering a second plurality of local parameter gradients and/or a second plurality of local parameter sets between the plurality of local computers includes delivering a second plurality of local bias gradients between the plurality of local computers, such as including delivering the second local bias gradient corresponding to each local computer with all other local computers of the plurality of local computers. For example, delivering a second plurality of local bias gradients includes delivering a second local bias gradient from a first local computer to a second local computer, a third local computer, . . . , and a $N^{th}$ local computer.

In various embodiments, the process S226 of delivering a second plurality of local parameter gradients and/or a second plurality of local parameter sets between the plurality of local computers includes delivering the second local parameter set corresponding to each local computer with all other local computers of the plurality of local computers. For example, delivering a second plurality of local parameter sets includes delivering a second local parameter set from a first local computer to a second local computer, a third local computer, . . . , and a $N^{th}$ local computer.

In various examples, the process S226 of delivering a second plurality of local parameter gradients and/or a second plurality of local parameter sets between the plurality of local computers includes delivering a second plurality of local sets of weights between the plurality of local computers, such as including delivering the second local set of weights corresponding to each local computer with all other local computers of the plurality of local computers. For example, delivering a second plurality of local sets of weights includes delivering a second local set of weights from a first local computer to a second local computer, a third local computer, . . . , and a $N^{th}$ local computer.

In various examples, the process S226 of delivering a second plurality of local parameter gradients and/or a second plurality of local parameter sets between the plurality of local computers includes delivering a second plurality of local sets of biases between the plurality of local computers, such as including delivering the second local set of biases corresponding to each local computer with all other local computers of the plurality of local computers. For example, delivering a second plurality of local sets of biases includes delivering a second local set of biases from a first local computer to a second local computer, a third local computer, . . . , and a $N^{th}$ local computer.

In various embodiments, the process S228 of generating a second global parameter update based at least in part on the second plurality of local parameter gradients and/or the second plurality of parameter sets includes generating a second plurality of global parameter gradients, such as by averaging the second plurality of local parameter gradients. In certain examples, the second global parameter update corresponds to the second plurality of global parameter gradients. In certain examples, the second plurality of global parameter gradients corresponds to the second plurality of local parameter gradients. In some examples, generating the second global parameter update includes generating the second global parameter update by at least backpropagating the second plurality of global parameter gradients into the one or more model layers of the machine learning model (e.g., at each local computer). In some examples, generating the second global parameter update includes generating the second global parameter update at each local computer.

In some examples, the process S228 of generating the second global parameter update includes generating a second global weight update based at least in part on a second plurality of local weight gradients. For example, generating a second global weight update includes generating the second global weight update by at least averaging the second plurality of local weight gradients. In certain examples, each second local weight gradient of the second plurality of local weight gradients corresponds to a second local loss and a corresponding local computer. For example, each second local weight gradient of the second plurality of local weight gradients corresponds to a local computer of the plurality of local computers.

In some examples, the process S228 of generating the second global parameter update includes generating a second global bias update based at least in part on a second plurality of local bias gradients. For example, generating a second global bias update includes generating the second global bias update by at least averaging the second plurality of local bias gradients. In certain examples, each second local bias gradient of the second plurality of local bias gradients corresponds to a second local loss and a corresponding local computer. For example, each second local bias gradient of the second plurality of local bias gradients corresponds to a local computer of the plurality of local computers.

In various embodiments, the process S228 of generating a second global parameter update based at least in part on the second plurality of local parameter gradients and/or the second plurality of parameter sets includes generating a second plurality of global parameter sets, such as by averaging the second plurality of local parameter sets. In certain examples, the second global parameter update corresponds to the second plurality of global parameter sets. In certain examples, the second plurality of global parameter sets corresponds to the second plurality of local parameter sets. In some examples, generating the second global parameter update includes generating the second global parameter update at each local computer.

In some examples, the process S228 of generating the second global parameter update includes generating a second global weight update based at least in part on a second plurality of local sets of weights. For example, generating a second global weight update includes generating the second global weight update by at least averaging the second plurality of local sets of weights. In certain examples, each second local set of weights of the second plurality of local sets of weights corresponds to a second local loss and a corresponding local computer. For example, each second local set of weights of the second plurality of local sets of weights corresponds to a local computer of the plurality of local computers.

In some examples, the process S228 of generating the second global parameter update includes generating a second global bias update based at least in part on a second plurality of local sets of biases. For example, generating a second global bias update includes generating the second global bias update by at least averaging the second plurality of local sets of biases. In certain examples, each second local set of biases of the second plurality of local sets of biases corresponds to a second local loss and a corresponding local computer. For example, each second local set of biases of the second plurality of local sets of biases corresponds to a local computer of the plurality of local computers.

In various embodiments, the process S230 of updating each machine learning model hosted at each local computer includes updating each machine learning model hosted at each local computer of the plurality of local computers by at least updating their corresponding active parameter set based at least in part on the second global parameter update, the second global weight update, and/or the second global bias update.

In certain embodiments, the process S206 of updating each machine learning model further includes implementing a time out period on each local computer such that each local computer is configured to reject receipt of local parameter gradient during the time out period. Alternatively, in certain embodiments, the process S206 of updating each machine learning model further includes implementing a time out period on each local computer such that each local computer is configured to only receive local parameter gradient during the time out period.

In some examples, the process S206 of updating each machine learning model further includes, before delivering the plurality of local parameter gradients, compressing the plurality of local parameter gradients at the plurality of local computers, and after delivering the plurality of local parameter gradients, decompressing the compressed plurality of local parameter gradients at the plurality of local computers.

In some examples, the process S206 of updating each machine learning model further includes, before delivering the second plurality of local weight gradients, compressing the second plurality of local weight gradients at the plurality of local computers, and after delivering the second plurality of local weight gradients, decompressing the compressed second plurality of local weight gradients at the plurality of local computers.

In some examples, the process S206 of updating each machine learning model further includes, before delivering the second plurality of local bias gradients, compressing the second plurality of local bias gradients at the plurality of local computers, and after delivering the second plurality of local bias gradients, decompressing the compressed second plurality of local bias gradients at the plurality of local computers.

In some examples, the process S206 of updating each machine learning model further includes, before delivering the plurality of local parameter gradients, encrypting the plurality of local parameter gradients at the plurality of local computers, and after delivering the plurality of local parameter gradients, decrypting the compressed plurality of local parameter gradients at the plurality of local computers.

In some examples, the process S206 of updating each machine learning model further includes, before delivering the second plurality of local weight gradients, encrypting the second plurality of local weight gradients at the plurality of local computers, and after delivering the second plurality of local weight gradients, decrypting the compressed second plurality of local weight gradients at the plurality of local computers.

In some examples, the process S206 of updating each machine learning model further includes, before delivering the second plurality of local bias gradients, encrypting the second plurality of local bias gradients at the plurality of local computers, and after delivering the second plurality of local bias gradients, decrypting the compressed second plurality of local bias gradients at the plurality of local computers.

In some examples, the process S206 of updating each machine learning model further includes, before delivering the plurality of local parameters, compressing the plurality of local parameters at the plurality of local computers, and after delivering the plurality of local parameters, decompressing the compressed plurality of local parameters at the plurality of local computers.

In some examples, the process S206 of updating each machine learning model further includes, before delivering the second plurality of local weights, compressing the second plurality of local weights at the plurality of local computers, and after delivering the second plurality of local weights, decompressing the compressed second plurality of local weights at the plurality of local computers.

In some examples, the process S206 of updating each machine learning model further includes, before delivering the second plurality of local biases, compressing the second plurality of local biases at the plurality of local computers, and after delivering the second plurality of local biases, decompressing the compressed second plurality of local biases at the plurality of local computers.

In some examples, the process S206 of updating each machine learning model further includes, before delivering the plurality of local parameters, encrypting the plurality of local parameters at the plurality of local computers, and after delivering the plurality of local parameters, decrypting the compressed plurality of local parameters at the plurality of local computers.

In some examples, the process S206 of updating each machine learning model further includes, before delivering the second plurality of local weights, encrypting the second plurality of local weights at the plurality of local computers, and after delivering the second plurality of local weights, decrypting the compressed second plurality of local weights at the plurality of local computers.

In some examples, the process S206 of updating each machine learning model further includes, before delivering the second plurality of local biases, encrypting the second plurality of local biases at the plurality of local computers, and after delivering the second plurality of local biases, decrypting the compressed second plurality of local biases at the plurality of local computers.

Figure 4:
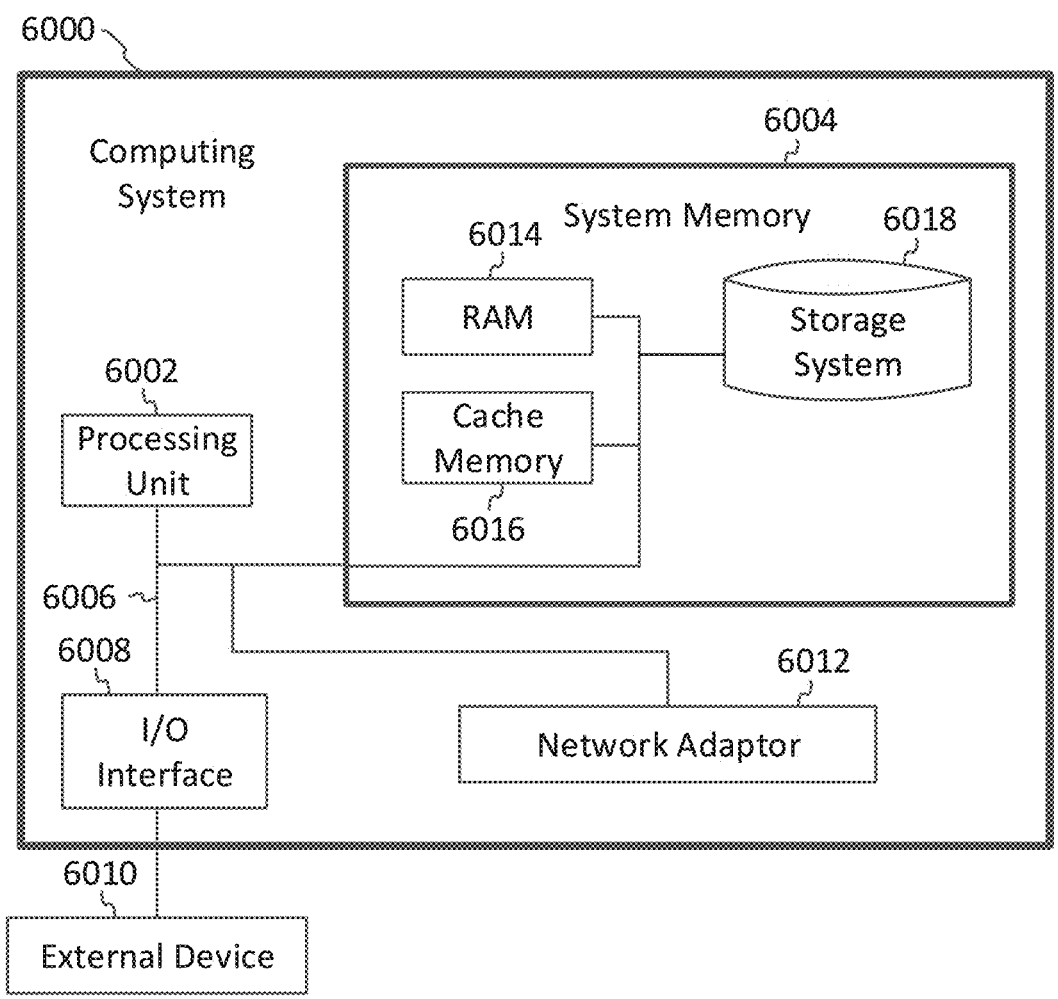
FIG. 4 is a simplified diagram showing a computing system, according to some embodiments.

FIG. 4 is a simplified diagram showing a computing system, according to some embodiments. This diagram is merely an example, which should not unduly limit the scope of the claims. One of ordinary skill in the art would recognize many variations, alternatives, and modifications. In certain examples, the computing system 6000 is a general-purpose computing device. In some examples, the computing system 6000 includes one or more processing units 6002 (e.g., one or more processors), one or more system memories 6004, one or more buses 6006, one or more input/output (I/O) interfaces 6008, and/or one or more network adapters 6012. In certain examples, the one or more buses 6006 connect various system components including, for example, the one or more system memories 6004, the one or more processing units 6002, the one or more input/output I/O) interfaces 6008, and/or the one or more network adapters 6012. Although the above has been shown using a selected group of components for the computing system, there can be many alternatives, modifications, and variations. For example, some of the components may be expanded and/or combined. Other components may be inserted to those noted above. Some components may be removed. Depending upon the embodiment, the arrangement of components may be interchanged with others replaced.

In certain examples, the computing system 6000 is a computer (e.g., a server computer, a client computer), a smartphone, a tablet, or a wearable device. In some examples, some or all processes (e.g., steps) of the method S100 and/or of the method S200 are performed by the computing system 6000. In certain examples, some or all processes (e.g., steps) of the method S100 and/or of the method S200 are performed by the one or more processing units 6002 directed by one or more codes. For example, the one or more codes are stored in the one or more system memories 6004 (e.g., one or more non-transitory computer-readable media), and are readable by the computing system 6000 (e.g., readable by the one or more processing units 6002). In various examples, the one or more system memories 6004 include one or more computer-readable media in the form of volatile memory, such as a random-access memory (RAM) 6014, a cache memory 6016, and/or a storage system 6018 (e.g., a floppy disk, a CD-ROM, and/or a DVD-ROM).

In some examples, the one or more input/output (I/O) interfaces 6008 of the computing system 6000 is configured to be in communication with one or more external devices 6010 (e.g., a keyboard, a pointing device, and/or a display). In certain examples, the one or more network adapters 6012 of the computing system 6000 is configured to communicate with one or more networks (e.g., a local area network (LAN), a wide area network (WAN), and/or a public network (e.g., the Internet)). In various examples, additional hardware and/or software modules are utilized in connection with the computing system 6000, such as one or more micro-codes and/or one or more device drivers.

Figure 5:
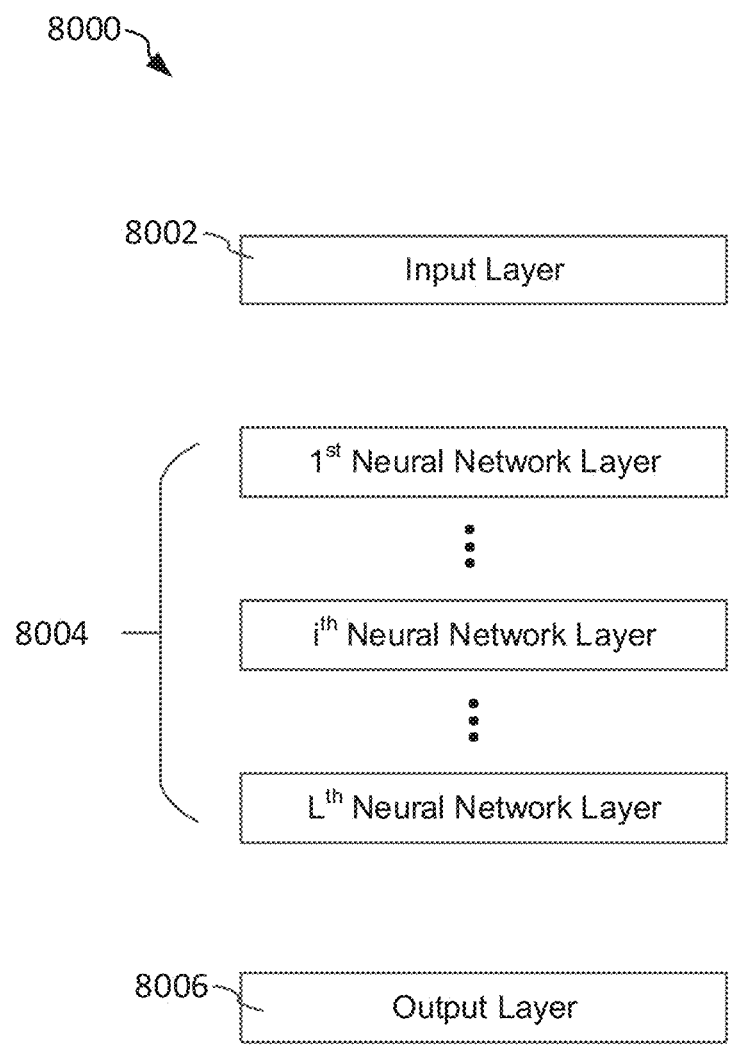
FIG. 5 is a simplified diagram showing a neural network, according to some embodiments.

FIG. 5 is a simplified diagram showing a neural network, according to certain embodiments. For example, the neural network is used by one or more of the machine learning models. This diagram is merely an example, which should not unduly limit the scope of the claims. One of ordinary skill in the art would recognize many variations, alternatives, and modifications. The neural network 8000 is an artificial neural network. In some examples, the neural network 8000 includes an input layer 8002, one or more hidden layers 8004, and an output layer 8006. For example, the one or more hidden layers 8004 includes L number of neural network layers, which include a $1^{st}$ neural network layer, . . . , an $i^{th}$ neural network layer, . . . and an $L^{th}$ neural network layer, where L is a positive integer and i is an integer that is larger than or equal to 1 and smaller than or equal to L. Although the above has been shown using a selected group of components for the neural network, there can be many alternatives, modifications, and variations. For example, some of the components may be expanded and/or combined. Other components may be inserted to those noted above. Some components may be removed. Depending upon the embodiment, the arrangement of components may be interchanged with others replaced.

In some examples, some or all processes (e.g., steps) of the method S100 and/or of the method S200 are performed by the neural network 8000 (e.g., using the computing system 6000). In certain examples, some or all processes (e.g., steps) of the method S100 and/or of the method S200 are performed by the one or more processing units 6002 directed by one or more codes that implement the neural network 8000. For example, the one or more codes for the neural network 8000 are stored in the one or more system memories 6004 (e.g., one or more non-transitory computer-readable media), and are readable by the computing system 6000 such as by the one or more processing units 6002.

In certain examples, the neural network 8000 is a deep neural network (e.g., a convolutional neural network). In some examples, each neural network layer of the one or more hidden layers 8004 includes multiple sublayers. As an example, the $i^{th}$ neural network layer includes a convolutional layer, an activation layer, and a pooling layer. For example, the convolutional layer is configured to perform feature extraction on an input (e.g., received by the input layer or from a previous neural network layer), the activation layer is configured to apply a nonlinear activation function (e.g., a ReLU function) to the output of the convolutional layer, and the pooling layer is configured to compress (e.g., to down-sample, such as by performing max pooling or average pooling) the output of the activation layer. As an example, the output layer 8006 includes one or more fully connected layers.

As discussed above and further emphasized here, FIG. 5 is merely an example, which should not unduly limit the scope of the claims. One of ordinary skill in the art would recognize many variations, alternatives, and modifications. For example, the neural network 8000 is replaced by an algorithm that is not an artificial neural network. As an example, the neural network 8000 is replaced by a machine learning model that is not an artificial neural network.

Figure 6:
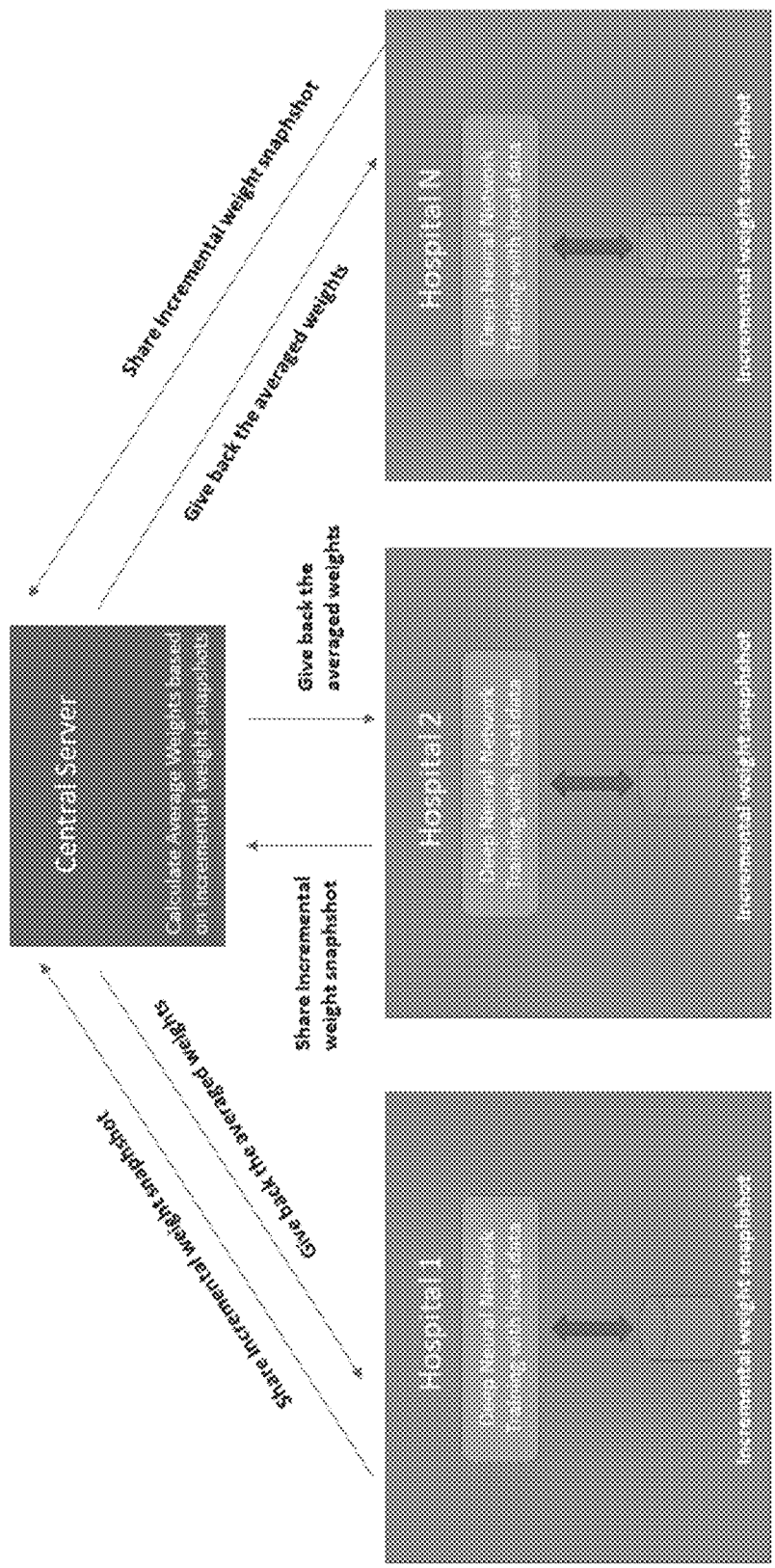
FIG. 6 is a simplified diagram showing a distributed medical network, according to some embodiments.

FIG. 6 is a simplified diagram showing a distributed medical network, according to some embodiments. In certain examples, the simplified diagram shows a centralized distributed medical network, such as a centralized distributed medical network including a network of deep neural networks. In certain examples, the centralized distributed medical network is configured to share data pertinent for training a deep neural network. In certain examples, the centralized distributed medical network is configured to leverage data located (e.g., stored) across multiple different geographical locations. In certain examples, the distributed medical network of FIG. 6 is configured to be enhanced by the system 10 of FIG. 1, such as via the method S100 of FIGS. 2A and 2B.

In certain embodiments, a distributed medical network is configured to share, such as selectively, incremental data snapshots. For example, a distributed medical network is configured to share, such as selectively, incremental weights and/or biases. In certain examples, a distributed medical network is configured to reduce bandwidth and increase speed of data sharing and model (e.g., neural network) training. In certain examples, a distributed medical network is configured to be enhanced via distributed deep learning, such as based at least in part on sharing of incremental neural network snapshots. In certain examples, a distributed medical network is configured to share one or more weight snapshots and/or one or more bias snapshots across different hospitals (e.g., across different computers at the different hospitals) in synchronous and/or asynchronous mode, such as in a centralized and/or decentralized configuration.

In certain embodiments, a distributed medical network is configured to share data between multiple computers (e.g., which each hosts a machine learning model, such as a neural network) at multiple hospitals. In certain examples, the system 10 of FIG. 1, such as via the method S100 of FIGS. 2A and 2B and/or the method S200 of FIGS. 3A and 3B is configured to train a distributed medical network, such as by training each neural network hosted at each local hospital of a hospital network with training data. In certain examples, training each neural network includes using local training data for each neural network and sharing parameters and/or gradients directly with other hospitals (e.g., in a decentralized configuration) or first to a central computer then to the other hospitals (e.g., in a centralized configuration).

In certain embodiments, a distributed medical network is configured to share data between multiple computers by at least sharing one or more incremental snapshots of weights and/or biases correspond to the plurality of neural networks hosted at the plurality of local computers at the plurality of hospitals. In certain examples, an incremental snapshot corresponds to only changes in the weights and/or biases and not share all the weights, which may include weights and biases that are zero (e.g., corresponds to no-changes). In certain examples, sharing of the incremental snapshot is performed after each iteration in each epoch or after each epoch. For example, in the first iteration or epoch, all weights and/or biases including non-zeros (e.g., changes) and zeros (e.g., no-changes) of a first computer (e.g., at a first hospital) are shared with other computers (e.g., at other hospitals), and in the second iteration or epoch, only incremental snapshots of weights and/or biases that are non-zeros (e.g., changes when compared to the neural network parameters in the first iteration) are shared. In certain examples, sharing data between a plurality of local computers (e.g., at hospitals) or between the plurality of local computers and a central computer, includes sharing, broadcasting, delivering, receiving, and/or transmitting data via cloud. In certain examples, sharing incremental snapshots (e.g., of weights and/or biases) includes compressing and/or encrypting the incremental snapshots before delivering to their designations, and decompressing and/or decrypting the compressed and/or encrypted incremental snapshots after delivery.

In certain embodiments, enhancing a distributed medical network includes snapshotting (e.g., incremental snapshotting) one or more weights and/or biases every iteration on a local computer (e.g., a local server) of the hospital, and calculating the difference between the new snapshot (e.g., from a recent iteration) and old snapshot (e.g., from a prior iteration). In certain examples, the difference is shared between a plurality of local hospitals (e.g., in a decentralized configuration) or with a central computer (e.g., in a centralized configuration). In certain examples, such as in a decentralized configuration (e.g., a coupled plurality of local computers at a plurality of local hospitals), enhancing a distributed medical network includes sharing one or more non-zero weight snapshots and/or bias snapshots from each hospital to the other hospitals. In certain examples, enhancing a distributed medical network includes, for each hospital, upon receiving the weight snapshots of other hospitals, calculating their corresponding weight update, such as based at least in part on their corresponding original weight and the weight snapshots, such as by averaging the weights and updating their local deep neural network. In certain examples, enhancing a distributed medical network includes, for each hospital, upon receiving the bias snapshots of other hospitals, calculating their corresponding bias update, such as based at least in part on their corresponding original bias and the bias snapshots, such as by averaging the biases and updating their local deep neural network. In certain examples, such as in a centralized configuration (e.g., a central computer coupled to a plurality of local computers at a plurality of local hospitals), enhancing a distributed medical network includes sharing one or more weights and/or bias snapshots (e.g., including only incremental changes) of a plurality of local computers (e.g., local servers) with a central computer (e.g., a central server, such as a cloud server).

In certain embodiments, enhancing a distributed medical network includes, at the central computer, upon receiving the weight snapshots from the plurality of local computers, calculating a global weight update, such as based at least in part on all original weights and/or weight snapshots of the plurality of hospitals, such as by averaging the weights, delivering the global weight update back to the plurality of hospitals, and updating each hospital's neural network with the global weight update. In certain examples, enhancing a distributed medical network includes, at the central computer, upon receiving the bias snapshots from the plurality of local computers, calculating a global bias update, such as based at least in part on all original biases and/or bias snapshots of the plurality of hospitals, such as by averaging the biases, delivering the global bias update back to the plurality of hospitals, and updating each hospital's neural network with the global bias update.

In certain embodiments, enhancing a distributed medical network includes training the deep neural networks at the local hospitals in an asynchronous workflow, such as by at least training the local deep neural networks whenever one or more snapshots (e.g., of weights and/or biases) is received, without a waiting period during which training (calculating and updating neural network parameters) is paused for receiving snapshots (e.g., of weights and/or biases) from other local hospitals or from a central server.

In certain embodiments, enhancing a distributed medical network includes training the deep neural networks at the local hospitals in an synchronous workflow, such as by at least training the local deep neural networks only once all expected snapshots (e.g., of weights and/or biases) from their respective hospitals are received, such as during a waiting period during which training (calculating and updating neural network parameters) is paused for receiving snapshots (e.g., of weights and/or biases) from other local hospitals or from a central server.

In certain embodiments, a method for enhancing a distributed medical network in a centralized configuration includes: initiating priming (e.g., first iteration training) at each hospital by at least inputting local hospital data into a neural network hosted at each local hospital; calculating, such as after the first training iteration, a loss for each neural network; generating one or more weight gradients (e.g., including zeros which correspond to no-change) and/or one or more bias gradients (e.g., including zeros which correspond to no-change) based at least in part on the loss; delivering the one or more weight gradients and/or one or more bias gradients from the local computers to a central server; optionally imposing a waiting period at the central server during which the central server waits to receive the one or more weight gradients and/or the one or more bias gradients from the local hospitals; upon receiving the one or more weight gradients and/or one or more bias gradients, calculating a global weight update and/or a global bias update such as by averaging all the weight gradients and/or averaging all the bias gradients received from the local computers; optionally imposing a time-out period during which the central server is configured to reject receipt of any weight gradient and/or bias gradient, such as by ignoring them in the calculating of the global weight update and/or the global bias update, or adding them into a queue for future iterations during the training process; delivering (e.g., broadcasting) the global weight update and/or the global bias update from the central server to the local hospitals; updating the neural networks at the local hospitals based at least in part on the global weight update and/or the global bias update, such as by creating a copy, saving the copy, and applying the copy to update the neural network; proceeding to next iteration training, such as using the same local training data used for priming (e.g., first iteration training); calculating, such as after the next training iteration, a loss for each neural network; generating incremental snapshots (e.g., containing only the non-zero gradients which corresponds to changes from values of a prior iteration) including one or more weight gradients (e.g., only including non-zeros which correspond to change) and/or one or more bias gradients (e.g., only including non-zeros which correspond to change) based at least in part on the loss, the weights, and/or biases of the previous iteration; optionally compressing and/or encrypting the incremental snapshots; delivering the incremental snapshots (e.g., including the one or more weight gradients and/or one or more bias gradients) from the local computers to a central server; optionally imposing a waiting period at the central server during which the central server waits to receive the incremental snapshots (e.g., including the one or more weight gradients and/or the one or more bias gradients) from the local hospitals; optionally decompressing and/or decrypting the incremental snapshots; and converting the incremental snapshots into a complete set of weight gradients and/or bias gradients (e.g., including zeros that corresponds to no change from the prior iteration and non-zeros corresponding to changes from the prior iteration); upon receiving the one or more weight gradients and/or the one or more bias gradients, calculating a global weight update and/or a global bias update such as by averaging all the weight gradients and/or averaging all the bias gradients received from the local computers; optionally imposing a time-out period during which the central server is configured to reject receipt of any weight gradient and/or bias gradient, such as by ignoring them in the calculating of the global weight update and/or the global bias update, or adding them into a queue for future iterations during the training process; delivering (e.g., broadcasting) the global weight update and/or the global bias update from the central server to the local hospitals; updating the neural networks at the local hospitals based at least in part on the global weight update and/or the global bias update, such as by creating a copy, saving the copy, and applying the copy to update the neural network; and repeating one or more processes of the method to continue the iterative training, such as until a pre-determined iteration quantity is completed.

In certain embodiments, a method for enhancing a distributed medical network in a decentralized configuration includes: initiating priming (e.g., first iteration training) at each hospital by at least inputting local hospital data into a neural network hosted at each local hospital; calculating, such as after the first training iteration, a loss for each neural network; generating one or more weight gradients (e.g., including zeros which correspond to no-change) and/or one or more bias gradients (e.g., including zeros which correspond to no-change) based at least in part on the loss; delivering the one or more weight gradients and/or one or more bias gradients from each local computer to the other local computers in the distributed medical network; optionally imposing a waiting period at each local computer during which the central server waits to receive the one or more weight gradients and/or the one or more bias gradients from the other hospitals; upon receiving the one or more weight gradients and/or one or more bias gradients, calculating a global weight update and/or a global bias update such as by averaging all the weight gradients (e.g., including its own weight gradient and the ones received from the other local computers) and/or averaging all the bias gradients (e.g., including its own bias gradient and the ones received from the other local computers); optionally imposing a time-out period during which each local computer is configured to reject receipt of any weight gradient and/or bias gradient, such as by ignoring them in the calculating of the global weight update and/or the global bias update, or adding them into a queue for future iterations during the training process; updating the neural networks at the local hospitals based at least in part on the global weight update and/or the global bias update, such as by creating a copy, saving the copy, and applying the copy to update the neural network; proceeding to next iteration training, such as using the same local training data used for priming (e.g., first iteration training); calculating, such as after the next training iteration, a loss for each neural network; generating incremental snapshots (e.g., containing only the non-zero gradients which corresponds to changes from values of a prior iteration) including one or more weight gradients (e.g., only including non-zeros which correspond to change) and/or one or more bias gradients (e.g., only including non-zeros which correspond to change) based at least in part on the loss, the weights, and/or biases of the previous iteration; optionally compressing and/or encrypting the incremental snapshots; delivering the incremental snapshots (e.g., including the one or more weight gradients and/or one or more bias gradients) from the local computers to a central server; optionally imposing a waiting period at each local computer during which the local computer waits to receive the incremental snapshots (e.g., including the one or more weight gradients and/or the one or more bias gradients) from the other hospitals; optionally decompressing and/or decrypting the incremental snapshots; converting the incremental snapshots into a complete set of weight gradients and/or bias gradients (e.g., including zeros corresponding to no change from the prior iteration and non-zeros corresponding to changes); upon receiving the one or more weight gradients and/or one or more bias gradients, calculating a global weight update and/or a global bias update such as by averaging all the weight gradients (e.g., including its own weight gradient and the ones received from the other local computers) and/or averaging all the bias gradients (e.g., including its own bias gradient and the ones received from the other local computers); optionally imposing a time-out period during which each local computer is configured to reject receipt of any weight gradient and/or bias gradient, such as by ignoring them in the calculating of the global weight update and/or the global bias update, or adding them into a queue for future iterations during the training process; updating the neural networks at the local hospitals based at least in part on the global weight update and/or the global bias update, such as by creating a copy, saving the copy, and applying the copy to update the neural network; and repeating one or more processes of the method to continue iterative training, such as until a pre-determined iteration quantity is completed.

In certain embodiments, a method for enhancing a distributed medical network in a centralized configuration includes: initiating priming (e.g., first iteration training) at each hospital by at least inputting local hospital data into a neural network hosted at each local hospital; calculating, such as after the first training iteration, a loss for each neural network; generating one or more weight gradients (e.g., including zeros which correspond to no-change) and/or one or more bias gradients (e.g., including zeros which correspond to no-change) based at least in part on the loss; generating one or more weight gradients and/or one or more biases based at least in part on the one or more weight gradients and/or the one or more bias gradients; delivering the one or more weights, and/or one or more biases from the local computers to a central server; optionally imposing a waiting period at the central server during which the central server waits to receive the one or more weights, and/or the one or more biases from the local hospitals; upon receiving the one or more weights, and/or one or more biases, calculating a global weight update and/or a global bias update such as by averaging all the weights and/or averaging all the biases received from the local computers; optionally imposing a time-out period during which the central server is configured to reject receipt of any weights and/or biases, such as by ignoring them in the calculating of the global weight update and/or the global bias update, or adding them into a queue for future iterations during the training process; delivering (e.g., broadcasting) the global weight update and/or the global bias update from the central server to the local hospitals; updating the neural networks at the local hospitals based at least in part on the global weight update and/or the global bias update, such as by creating a copy, saving the copy, and applying the copy to update the neural network; proceeding to next iteration training, such as using the same local training data used for priming (e.g., first iteration training); calculating, such as after the next training iteration, a loss for each neural network; generating incremental snapshots (e.g., containing only the non-zero weights and/or biases which corresponds to changes from values of a prior iteration) including one or more weights (e.g., only including changed values compared from the prior iteration) and/or one or more biases (e.g., only including changed values compared from the prior iteration) based at least in part on the loss, the weights, and/or biases of the previous iteration; optionally compressing and/or encrypting the incremental snapshots; delivering the incremental snapshots (e.g., including the one or more weights and/or one or more biases) from the local computers to a central server; optionally imposing a waiting period at the central server during which the central server waits to receive the incremental snapshots (e.g., including the one or more weights and/or the one or more biases) from the local hospitals; optionally decompressing and/or decrypting the incremental snapshots; and converting the incremental snapshots into a complete set of weights and/or biases (e.g., including weight and/or bias values unchanged from a prior iteration); upon receiving the one or more weights, one or more biases, complete set of weights and/or complete set of biases, calculating a global weight update and/or a global bias update such as by averaging all the weights and/or averaging all the biases received from the local computers; optionally imposing a time-out period during which the central server is configured to reject receipt of any weights and/or biases, such as by ignoring them in the calculating of the global weight update and/or the global bias update, or adding them into a queue for future iterations during the training process; delivering (e.g., broadcasting) the global weight update and/or the global bias update from the central server to the local hospitals; updating the neural networks at the local hospitals based at least in part on the global weight update and/or the global bias update, such as by creating a copy, saving the copy, and applying the copy to update the neural network; and repeating one or more processes of the method to continue the iterative training, such as until a pre-determined iteration quantity is completed.

In certain embodiments, a method for enhancing a distributed medical network in a decentralized configuration includes: initiating priming (e.g., first iteration training) at each hospital by at least inputting local hospital data into a neural network hosted at each local hospital; calculating, such as after the first training iteration, a loss for each neural network; generating one or more weights (e.g., including zeros which correspond to no-change) and/or one or more biases (e.g., including zeros which correspond to no-change) based at least in part on the loss; delivering the one or more weights and/or one or more biases from each local computer to the other local computers in the distributed medical network; optionally imposing a waiting period at each local computer during which the central server waits to receive the one or more weights and/or the one or more biases from the other hospitals; upon receiving the one or more weights and/or one or more biases, calculating a global weight update and/or a global bias update such as by averaging all the weights (e.g., including its own bias and the ones received from the other local computers) and/or averaging all the biases (e.g., including its own bias and the ones received from the other local computers); optionally imposing a time-out period during which each local computer is configured to reject receipt of any weights and/or biases, such as by ignoring them in the calculating of the global weight update and/or the global bias update, or adding them into a queue for future iterations during the training process; updating the neural networks at the local hospitals based at least in part on the global weight update and/or the global bias update, such as by creating a copy, saving the copy, and applying the copy to update the neural network; proceeding to next iteration training, such as using the same local training data used for priming (e.g., first iteration training); calculating, such as after the next training iteration, a loss for each neural network; generating incremental snapshots (e.g., containing only the non-zero which corresponds to changes from values of a prior iteration) including one or more weights (e.g., only including values different from the prior iteration) and/or one or more biases (e.g., only including values different from the prior iteration) based at least in part on the loss, the weights, and/or biases of the previous iteration; optionally compressing and/or encrypting the incremental snapshots; delivering the incremental snapshots (e.g., including the one or more weights and/or one or more biases) from the local computers to a central server; optionally imposing a waiting period at each local computer during which the local computer waits to receive the incremental snapshots (e.g., including the the one or more weights and/or the one or more biases) from the other hospitals; optionally decompressing and/or decrypting the incremental snapshots; converting the incremental snapshots into a complete set of weights (e.g., including values different from the prior iteration and values same as in the prior iteration) and/or a complete set of biases (e.g., including values different from the prior iteration and values same as in the prior iteration); upon receiving the one or more weights and/or one or more biases, calculating a global weight update and/or a global bias update such as by averaging all the weights (e.g., including its own weight and the ones received from the other local computers) and/or averaging all the biases (e.g., including its own bias and the ones received from the other local computers); optionally imposing a time-out period during which each local computer is configured to reject receipt of any weights and/or biases, such as by ignoring them in the calculating of the global weight update and/or the global bias update, or adding them into a queue for future iterations during the training process; updating the neural networks at the local hospitals based at least in part on the global weight update and/or the global bias update, such as by creating a copy, saving the copy, and applying the copy to update the neural network; and repeating one or more processes of the method to continue iterative training, such as until a pre-determined iteration quantity is completed.

In various embodiments, a computer-implemented method for enhancing a distributed medical network (e.g., a distributed medical network including a plurality of local computers, each local computer of the plurality of local computers hosting a machine learning model configured with an active parameter set) includes: inputting training data corresponding to each local computer into their corresponding machine learning model; generating a plurality of local losses including generating a local loss for each machine learning model based at least in part on the corresponding training data; generating a plurality of local parameter gradients including generating a local parameter gradient for each machine learning model based at least in part on the corresponding local loss; generating a global parameter update based at least in part on the plurality of local parameter gradients; and updating each machine learning model hosted at each local computer of the plurality of local computers by at least updating their corresponding active parameter set based at least in part on the global parameter update. In certain examples, the computer-implemented method is performed by one or more processors. In some examples, the computer-implemented method is implemented at least partly according to the method S100 of FIGS. 2A and 2B and/or the method S200 of FIGS. 3A and 3B. In certain examples, the method is implemented at least partly by the system 10 of FIG. 1.

In some embodiments, the local parameter gradient is a local weight gradient and/or a local bias gradient.

In some embodiments, the generating a local parameter gradient includes determining a non-zero parameter gradient.

In some embodiments, the generating the global parameter update includes averaging the plurality of local parameter gradients.

In some embodiments, the method further includes: delivering the plurality of local parameter gradients from the plurality of local computers to a central computer of the distributed medical network; and delivering the global parameter update from the central computer to the plurality of local computers. In certain examples, the generating a global parameter update includes generating the global parameter update at the central computer.

In some embodiments, the method further includes implementing a time out period on the central computer such that the central computer is configured to reject receipt of local parameter gradient during the time out period.

In some embodiments, the method further includes: before delivering the plurality of local parameter gradients, compressing the plurality of local parameter gradients at the plurality of local computers; and after delivering the plurality of local parameter gradients, decompressing the compressed plurality of local parameter gradients at the central computer.

In some embodiments, the method further includes: before delivering the plurality of local parameter gradients, encrypting the plurality of local parameter gradients at the plurality of local computers; and after delivering the plurality of local parameter gradients, decrypting the encrypted plurality of local parameter gradients at the central computer.

In some embodiments, the method further includes delivering the plurality of local parameter gradients between the plurality of local computers. In certain examples, the generating a global parameter update includes generating the global parameter update at each local computer of the plurality of local computers.

In some embodiments, the method further includes implementing a time out period on each local computer such that each local computer is configured to reject receipt of local parameter gradient during and/or after the time out period.

In some embodiments, the method further includes: before delivering the plurality of local parameter gradients, compressing the plurality of local parameter gradients at the plurality of local computers; and after delivering the plurality of local parameter gradients, decompressing the compressed plurality of local parameter gradients at the plurality of local computers.

In some embodiments, the method further includes: before delivering the plurality of local parameter gradients, encrypting the plurality of local parameter gradients at the plurality of local computers; and after delivering the plurality of local parameter gradients, decrypting the encrypted plurality of local parameter gradients at the plurality of local computers.

In some embodiments, the method further includes: generating a plurality of local parameter sets including generating a local parameter set for each machine learning model based at least in part on a corresponding local parameter gradient of the plurality of local parameter gradients. In certain examples, the generating a global parameter update based at least in part on the plurality of local parameter gradients includes generating the global parameter update based at least in part on the plurality of local parameter sets.

In some embodiments, the local parameter set includes one of a local set of weights and a local set of biases.

In some embodiments, the generating the global parameter update includes averaging the plurality of local parameter sets.

In some embodiments, the method further includes: delivering the plurality of local parameter sets from the plurality of local computers to a central computer of the distributed medical network; and delivering the global parameter update from the central computer to the plurality of local computers. In certain examples, the generating a global parameter update includes generating the global parameter update at the central computer.

In some embodiments, the method further includes: implementing a time out period on the central computer such that the central computer is configured to reject receipt of local parameter set during and/or after the time out period.

In some embodiments, the method further includes: before delivering the plurality of local parameter sets, compressing the plurality of local parameter sets at the plurality of local computers; and after delivering the plurality of local parameter sets, decompressing the compressed plurality of local parameter sets at the central computer.

In some embodiments, the method further includes: before delivering the plurality of local parameter sets, encrypting the plurality of local parameter sets at the plurality of local computers; and after delivering the plurality of local parameter sets, decrypting the encrypted plurality of local parameter sets at the central computer.

In some embodiments, the method further includes: delivering the plurality of local parameter sets between the plurality of local computers. In certain examples, the generating a global parameter update includes generating the global parameter update at each local computer of the plurality of local computers.

In some embodiments, the method further includes implementing a time out period on each local computer such that each local computer is configured to reject receipt of local parameter set during and/or after the time out period.

In some embodiments, the method further includes: before delivering the plurality of local parameter sets, compressing the plurality of local parameter sets at the plurality of local computers; and after delivering the plurality of local parameter sets, decompressing the compressed plurality of local parameter sets at the plurality of local computers.

In some embodiments, the method further includes: before delivering the plurality of local parameter sets, encrypting the plurality of local parameter sets at the plurality of local computers; and after delivering the plurality of local parameter sets, decrypting the encrypted plurality of local parameter sets at the plurality of local computers.

In various embodiments, a system for enhancing a distributed medical network (e.g., a distributed medical network including a plurality of local computers, each local computer of the plurality of local computers hosting a machine learning model configured with an active parameter set) includes: a data inputting module configured to input training data corresponding to each local computer into their corresponding machine learning model; a loss generating module configured to generate a plurality of local losses by at least generating a local loss for each machine learning model based at least in part on the corresponding training data; a gradient generating module configured to generate a plurality of local parameter gradients by at least generating a local parameter gradient for each machine learning model based at least in part on the corresponding local loss; an update generating module configured to generate a global parameter update based at least in part on the plurality of local parameter gradients; and a model updating module configured to update each machine learning model hosted at each local computer of the plurality of local computers by at least updating their corresponding active parameter set based at least in part on the global parameter update. In some examples, the system is implemented at least partly according to the system 10 of FIG. 1. In certain examples, the system is configured to perform, at least partly, the method S100 of FIGS. 2A and 2B and/or the method S200 of FIGS. 3A and 3B.

In some embodiments, the local parameter gradient is one of a local weight gradient and a local bias gradient.

In some embodiments, the gradient generating module is configured determine a non-zero parameter gradient.

In some embodiments, the update generating module is configured to generate the global parameter update by at least averaging the plurality of local parameter gradients.

In some embodiments, the system further includes: a local gradient delivering module configured to deliver the plurality of local parameter gradients from the plurality of local computers to a central computer of the distributed medical network; and an update delivering module configured to deliver the global parameter update from the central computer to the plurality of local computers. In certain examples, the update generating module is configured to generate the global parameter update at the central computer.

In some embodiments, the system further includes a time out module configured to implement a time out period on the central computer such that the central computer is configured to reject receipt of local parameter gradient during and/or after the time out period.

In some embodiments, the system further includes a compression module configured to: compress the plurality of local parameter gradients at the plurality of local computers; and decompress the compressed plurality of parameter gradients at the central computer.

In some embodiments, the system further includes an encryption module configured to: encrypt the plurality of local parameter gradients at the plurality of local computers; and decrypt the encrypted plurality of parameter gradients at the central computer.

In some embodiments, the system further includes a local gradient delivering module configured to deliver the plurality of local parameter gradients between the plurality of local computers. In certain examples, the update generating module is configured to generate the global parameter update at each local computer of the plurality of local computers.

In some embodiments, the system further includes a time out module configured to implement a time out period on each local computer such that each local computer is configured to reject receipt of local parameter gradient during and/or after the time out period.

In some embodiments, the system further includes a compression module configured to: compress the plurality of local parameter gradients at the plurality of local computers; and decompress the compressed plurality of local parameter gradients at the plurality of local computers.

In some embodiments, the system further includes an encryption module configured to: encrypt the plurality of local parameter gradients at the plurality of local computers; and decrypt the encrypted plurality of local parameter gradients at the plurality of local computers.

In some embodiments, the system further includes a parameter set generating module configured to generate a plurality of local parameter sets by at least generating a local parameter set for each machine learning model based at least in part on a corresponding local parameter gradient of the plurality of local parameter gradients. In certain examples, the update generating module is configured to generate the global parameter update based at least in part on the plurality of local parameter sets.

In some embodiments, the local parameter set includes one of a local set of weights and a local set of biases.

In some embodiments, the update generating module is configured to generate the global parameter update by at least averaging the plurality of local parameter sets.

In some embodiments, the system further includes: a local parameter set delivering module configured to deliver the plurality of local parameter sets from the plurality of local computers to a central computer of the distributed medical network; and an update delivering module configured to deliver the global parameter update from the central computer to the plurality of local computers. In certain examples, the update generating module is configured to generate the global parameter update at the central computer.

In some embodiments, the system further includes a time out module configured to implement a time out period on the central computer such that the central computer is configured to reject receipt of local parameter set during and/or after the time out period.

In some embodiments, the system further includes a compression module configured to: compress the plurality of local parameter sets at the plurality of local computers; and decompress the compressed plurality of parameter sets at the central computer.

In some embodiments, the system further includes an encryption module configured to: encrypt the plurality of local parameter sets at the plurality of local computers; and decrypt the encrypted plurality of parameter sets at the central computer.

In some embodiments, the system further includes a local parameter set delivering module configured to deliver the plurality of local parameter sets between the plurality of local computers. In certain examples, the update generating module is configured to generate the global parameter update at each local computer of the plurality of local computers.

In some embodiments, the system further includes a time out module configured to implement a time out period on each local computer such that each local computer is configured to reject receipt of local parameter set during and/or after the time out period.

In some embodiments, the system further includes a compression module configured to: compress the plurality of local parameter sets at the plurality of local computers; and decompress the compressed plurality of local parameter sets at the plurality of local computers.

In some embodiments, the system further includes an encryption module configured to: encrypt the plurality of local parameter sets at the plurality of local computers; and decrypt the encrypted plurality of local parameter sets at the plurality of local computers.

In various embodiments, a non-transitory computer-readable medium with instructions stored thereon, that when executed by a processor, causes the processor to perform one or more processes including: inputting training data corresponding to each local computer into their corresponding machine learning model; generating a plurality of local losses including generating a local loss for each machine learning model based at least in part on the corresponding training data; generating a plurality of local parameter gradients including generating a local parameter gradient for each machine learning model based at least in part on the corresponding local loss; generating a global parameter update based at least in part on the plurality of local parameter gradients; and updating each machine learning model hosted at each local computer of the plurality of local computers by at least updating their corresponding active parameter set based at least in part on the global parameter update. In some examples, the non-transitory computer-readable medium with instructions stored thereon is implemented according to the method S100 of FIGS. 2A and 2B and/or the method S200 of FIGS. 3A and 3B. In certain examples, the non-transitory computer-readable medium with instructions stored thereon is configured to be implemented at least partly by the system 10 (e.g., a terminal) of FIG. 1.

In some embodiments, the local parameter gradient is a local weight gradient and/or a local bias gradient.

In some embodiments, the non-transitory computer-readable medium with instructions stored thereon, that when executed by a processor, causes the processor to perform: determining a non-zero parameter gradient.

In some embodiments, the non-transitory computer-readable medium with instructions stored thereon, that when executed by a processor, causes the processor to perform: averaging the plurality of local parameter gradients.

In some embodiments, the non-transitory computer-readable medium with instructions stored thereon, that when executed by a processor, causes the processor to perform: delivering the plurality of local parameter gradients from the plurality of local computers to a central computer of the distributed medical network; and delivering the global parameter update from the central computer to the plurality of local computers. In certain examples, the generating a global parameter update includes generating the global parameter update at the central computer.

In some embodiments, the non-transitory computer-readable medium with instructions stored thereon, that when executed by a processor, causes the processor to perform: implementing a time out period on the central computer such that the central computer is configured to reject receipt of local parameter gradient during and/or after the time out period.

In some embodiments, the non-transitory computer-readable medium with instructions stored thereon, that when executed by a processor, causes the processor to perform: before delivering the plurality of local parameter gradients, compressing the plurality of local parameter gradients at the plurality of local computers; and after delivering the plurality of local parameter gradients, decompressing the compressed plurality of local parameter gradients at the central computer.

In some embodiments, the non-transitory computer-readable medium with instructions stored thereon, that when executed by a processor, causes the processor to perform: before delivering the plurality of local parameter gradients, encrypting the plurality of local parameter gradients at the plurality of local computers; and after delivering the plurality of local parameter gradients, decrypting the encrypted plurality of local parameter gradients at the central computer.

In some embodiments, the non-transitory computer-readable medium with instructions stored thereon, that when executed by a processor, causes the processor to perform: delivering the plurality of local parameter gradients between the plurality of local computers. In certain examples, the generating a global parameter update includes generating the global parameter update at each local computer of the plurality of local computers.

In some embodiments, the non-transitory computer-readable medium with instructions stored thereon, that when executed by a processor, causes the processor to perform: implementing a time out period on each local computer such that each local computer is configured to reject receipt of local parameter gradient during and/or after the time out period.

In some embodiments, the non-transitory computer-readable medium with instructions stored thereon, that when executed by a processor, causes the processor to perform: before delivering the plurality of local parameter gradients, compressing the plurality of local parameter gradients at the plurality of local computers; and after delivering the plurality of local parameter gradients, decompressing the compressed plurality of local parameter gradients at the plurality of local computers.

In some embodiments, the non-transitory computer-readable medium with instructions stored thereon, that when executed by a processor, causes the processor to perform: before delivering the plurality of local parameter gradients, encrypting the plurality of local parameter gradients at the plurality of local computers; and after delivering the plurality of local parameter gradients, decrypting the encrypted plurality of local parameter gradients at the plurality of local computers.

In some embodiments, the non-transitory computer-readable medium with instructions stored thereon, that when executed by a processor, causes the processor to perform: generating a plurality of local parameter sets including generating a local parameter set for each machine learning model based at least in part on a corresponding local parameter gradient of the plurality of local parameter gradients. In certain examples, the generating a global parameter update based at least in part on the plurality of local parameter gradients includes generating the global parameter update based at least in part on the plurality of local parameter sets.

In some embodiments, the local parameter set includes one of a local set of weights and a local set of biases.

In some embodiments, the generating the global parameter update includes averaging the plurality of local parameter sets.

In some embodiments, the non-transitory computer-readable medium with instructions stored thereon, that when executed by a processor, causes the processor to perform: delivering the plurality of local parameter sets from the plurality of local computers to a central computer of the distributed medical network; and delivering the global parameter update from the central computer to the plurality of local computers. In certain examples, the generating a global parameter update includes generating the global parameter update at the central computer.

In some embodiments, the non-transitory computer-readable medium with instructions stored thereon, that when executed by a processor, causes the processor to perform: implementing a time out period on the central computer such that the central computer is configured to reject receipt of local parameter set during and/or after the time out period.

In some embodiments, the non-transitory computer-readable medium with instructions stored thereon, that when executed by a processor, causes the processor to perform: before delivering the plurality of local parameter sets, compressing the plurality of local parameter sets at the plurality of local computers; and after delivering the plurality of local parameter sets, decompressing the compressed plurality of local parameter sets at the central computer.

In some embodiments, the non-transitory computer-readable medium with instructions stored thereon, that when executed by a processor, causes the processor to perform: before delivering the plurality of local parameter sets, encrypting the plurality of local parameter sets at the plurality of local computers; and after delivering the plurality of local parameter sets, decrypting the encrypted plurality of local parameter sets at the central computer.

In some embodiments, the non-transitory computer-readable medium with instructions stored thereon, that when executed by a processor, causes the processor to perform: delivering the plurality of local parameter sets between the plurality of local computers. In certain examples, the generating a global parameter update includes generating the global parameter update at each local computer of the plurality of local computers.

In some embodiments, the non-transitory computer-readable medium with instructions stored thereon, that when executed by a processor, causes the processor to perform: implementing a time out period on each local computer such that each local computer is configured to reject receipt of local parameter set during and/or after the time out period.

In some embodiments, the non-transitory computer-readable medium with instructions stored thereon, that when executed by a processor, causes the processor to perform: before delivering the plurality of local parameter sets, compressing the plurality of local parameter sets at the plurality of local computers; and after delivering the plurality of local parameter sets, decompressing the compressed plurality of local parameter sets at the plurality of local computers.

In some embodiments, the non-transitory computer-readable medium with instructions stored thereon, that when executed by a processor, causes the processor to perform: before delivering the plurality of local parameter sets, encrypting the plurality of local parameter sets at the plurality of local computers; and after delivering the plurality of local parameter sets, decrypting the encrypted plurality of local parameter sets at the plurality of local computers.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A computer-implemented method for enhancing a distributed medical network including a plurality of local computers, each local computer of the plurality of local computers hosting a machine learning model configured with an active parameter set, the method comprising:
    inputting training data corresponding to each local computer into a corresponding machine learning model;
    generating a plurality of local losses including generating a local loss for each machine learning model based at least in part on the corresponding training data;
    generating a plurality of local parameter gradients including generating a local parameter gradient for each machine learning model based at least in part on the corresponding local loss;
    generating a global parameter update based at least in part on the plurality of local parameter gradients;
    updating each machine learning model hosted at each local computer of the plurality of local computers by at least updating their corresponding active parameter set based at least in part on the global parameter update;
    delivering the plurality of local parameter gradients from the plurality of local computers to a central computer of the distributed medical network; and
    delivering the global parameter update from the central computer to the plurality of local computers;
    wherein the generating a global parameter update includes generating the global parameter update at the central computer.

2. The computer-implemented method of claim 1, wherein the local parameter gradient is one of a local weight gradient and a local bias gradient.

3. The computer-implemented method of claim 1, wherein the generating a local parameter gradient includes determining a non-zero parameter gradient.

4. The computer-implemented method of claim 1, wherein the generating the global parameter update includes averaging the plurality of local parameter gradients.

5. The computer-implemented method of claim 1, further comprising:
    before delivering the plurality of local parameter gradients, compressing and encrypting the plurality of local parameter gradients at the plurality of local computers; and
    after delivering the plurality of local parameter gradients, decrypting and decompressing the compressed plurality of local parameter gradients at the central computer.

6. The computer-implemented method of claim 1, further includes:
    implementing a time out period on the central computer such that the central computer is configured to reject receipt of local parameter gradient after the time out period.

7. A system for enhancing a distributed medical network including a plurality of local computers, each local computer of the plurality of local computers hosting a machine learning model configured with an active parameter set, the system comprising:
    a data inputting module implemented by one or more processors and configured to input training data corresponding to each local computer into a corresponding machine learning model;
    a loss generating module implemented by the one or more processors and configured to generate a plurality of local losses by at least generating a local loss for each machine learning model based at least in part on the corresponding training data;
    a gradient generating module implemented by the one or more processors and configured to generate a plurality of local parameter gradients by at least generating a local parameter gradient for each machine learning model based at least in part on the corresponding local loss;
    an update generating module implemented by the one or more processors and configured to generate a global parameter update based at least in part on the plurality of local parameter gradients;
    a model updating module implemented by the one or more processors and configured to update each machine learning model hosted at each local computer of the plurality of local computers by at least updating their corresponding active parameter set based at least in part on the global parameter update; and
    a delivering module implemented by the one or more processors and configured to:
        deliver the plurality of local parameter gradients from the plurality of local computers to a central computer of the distributed medical network; and
        deliver the global parameter update from the central computer to the plurality of local computers;
    wherein the update generating module is further configured to generate the global parameter update at the central computer.

8. A computer-implemented method for enhancing a distributed medical network including a plurality of local computers, each local computer of the plurality of local computers hosting a machine learning model configured with an active parameter set, the method comprising:
    inputting training data corresponding to each local computer into a corresponding machine learning model;
    generating a plurality of local losses including generating a local loss for each machine learning model based at least in part on the corresponding training data;
    generating a plurality of local parameter gradients including generating a local parameter gradient for each machine learning model based at least in part on the corresponding local loss;

generating a global parameter update based at least in part on the plurality of local parameter gradients;
updating each machine learning model hosted at each local computer of the plurality of local computers by at least updating their corresponding active parameter set based at least in part on the global parameter update; and
delivering the plurality of local parameter gradients between the plurality of local computers;
wherein the generating a global parameter update includes generating the global parameter update at each local computer of the plurality of local computers.

9. The computer-implemented method of claim 8, further comprising:
implementing a time out period on each local computer such that each local computer is configured to reject receipt of local parameter gradient after the time out period.

10. The computer-implemented method of claim 8, further comprising:
before delivering the plurality of local parameter gradients, compressing and encrypting the plurality of local parameter gradients at the plurality of local computers; and
after delivering the plurality of local parameter gradients, decrypting and decompressing the compressed plurality of local parameter gradients at the plurality of local computers.

11. A computer-implemented method for enhancing a distributed medical network including a plurality of local computers, each local computer of the plurality of local computers hosting a machine learning model configured with an active parameter set, the method comprising:
inputting training data corresponding to each local computer into a corresponding machine learning model;
generating a plurality of local losses including generating a local loss for each machine learning model based at least in part on the corresponding training data;
generating a plurality of local parameter gradients including generating a local parameter gradient for each machine learning model based at least in part on the corresponding local loss;
generating a global parameter update based at least in part on the plurality of local parameter gradients;
updating each machine learning model hosted at each local computer of the plurality of local computers by at least updating their corresponding active parameter set based at least in part on the global parameter update;
generating a plurality of local parameter sets including generating a local parameter set for each machine learning model based at least in part on a corresponding local parameter gradient of the plurality of local parameter gradients;
wherein the generating a global parameter update based at least in part on the plurality of local parameter gradients includes generating the global parameter update based at least in part on the plurality of local parameter sets;
delivering the plurality of local parameter sets from the plurality of local computers to a central computer of the distributed medical network; and
delivering the global parameter update from the central computer to the plurality of local computers;
wherein the generating a global parameter update includes generating the global parameter update at the central computer.

12. The computer-implemented method of claim 11, wherein the local parameter set includes one of a local set of weights and a local set of biases.

13. The computer-implemented method of claim 11, wherein the generating the global parameter update includes averaging the plurality of local parameter sets.

14. The computer-implemented method of claim 11, further comprising:
before delivering the plurality of local parameter sets, compressing and encrypting the plurality of local parameter sets at the plurality of local computers; and
after delivering the plurality of local parameter sets, decrypting and decompressing the compressed plurality of local parameter sets at the central computer.

15. The computer-implemented method of claim 11, further includes:
implementing a time out period on the central computer such that the central computer is configured to reject receipt of local parameter set after the time out period.

16. A non-transitory computer-readable medium with instructions stored thereon, that when executed by a processor, causes the processor to perform one or more processes including:
inputting training data corresponding to each local computer of a plurality of local computers into a corresponding machine learning model, each local computer of the plurality of local computers hosting a machine learning model;
generating a plurality of local losses including generating a local loss for each machine learning model based at least in part on the corresponding training data;
generating a plurality of local parameter gradients including generating a local parameter gradient for each machine learning model based at least in part on the corresponding local loss;
generating a global parameter update based at least in part on the plurality of local parameter gradients; and
updating each machine learning model hosted at each local computer of the plurality of local computers by at least updating their corresponding active parameter set based at least in part on the global parameter update; and
delivering the plurality of local parameter gradients between the plurality of local computers;
wherein the generating a global parameter update includes generating the global parameter update at each local computer of the plurality of local computers.

17. A computer-implemented method for enhancing a distributed medical network including a plurality of local computers, each local computer of the plurality of local computers hosting a machine learning model configured with an active parameter set, the method comprising:
inputting training data corresponding to each local computer into a corresponding machine learning model;
generating a plurality of local losses including generating a local loss for each machine learning model based at least in part on the corresponding training data;
generating a plurality of local parameter gradients including generating a local parameter gradient for each machine learning model based at least in part on the corresponding local loss;
generating a global parameter update based at least in part on the plurality of local parameter gradients;
updating each machine learning model hosted at each local computer of the plurality of local computers by at least updating their corresponding active parameter set based at least in part on the global parameter update;

generating a plurality of local parameter sets including generating a local parameter set for each machine learning model based at least in part on a corresponding local parameter gradient of the plurality of local parameter gradients;

wherein the generating a global parameter update based at least in part on the plurality of local parameter gradients includes generating the global parameter update based at least in part on the plurality of local parameter sets;

delivering the plurality of local parameter sets between the plurality of local computers;

wherein the generating a global parameter update includes generating the global parameter update at each local computer of the plurality of local computers.

18. The computer-implemented method of claim 17, further comprising:

before delivering the plurality of local parameter sets, compressing and encrypting the plurality of local parameter sets at the plurality of local computers; and after delivering the plurality of local parameter sets, decrypting and decompressing the compressed plurality of local parameter sets at the plurality of local computers.

* * * * *